United States Patent [19]

Sakane et al.

[11] 4,335,405
[45] Jun. 15, 1982

[54] MOS-IMAGE SENSOR

[75] Inventors: Toshio Sakane; Tokuichi Tsunekawa, both of Yokohama, Japan

[73] Assignee: Canon Kabushiki Kaisha, Tokyo, Japan

[21] Appl. No.: 142,749

[22] Filed: Apr. 22, 1980

[30] Foreign Application Priority Data

Apr. 28, 1979 [JP] Japan .................................. 54-52621

[51] Int. Cl.³ ............................................. H04N 3/15
[52] U.S. Cl. ..................................... 358/213; 357/30
[58] Field of Search ................. 358/212, 213, 167, 44; 307/311; 250/208, 211 J, 211 R, 578; 357/30, 32

[56] References Cited

U.S. PATENT DOCUMENTS 4,007,488  2/1977  Morishita ............................ 358/213
4,011,402  3/1977  Koike .................................. 358/213
4,055,836 10/1977  Weimer ............................... 358/213
4,067,046  1/1978  Nakatani ............................. 358/213
4,145,721  3/1979  Beaudouin .......................... 358/213
4,233,632 11/1980  Akiyama ............................. 358/212

Primary Examiner—Michael A. Masinick
Attorney, Agent, or Firm—Toren, McGeady & Stanger

[57] ABSTRACT

In the disclosed MOS-image sensor, a plurality of signal-integrating type photo-sensitive elements are set to values that depend upon the light to which they have been exposed and the time of exposure. Readout gate switches responding to a readout address arrangement sequentially read out the content of the elements. Individual reset gate switches that respond to a reset address arrangement reset each of the elements a desired time prior to the readout so as to control the signal integration time of each of the elements.

14 Claims, 76 Drawing Figures

FIG.1
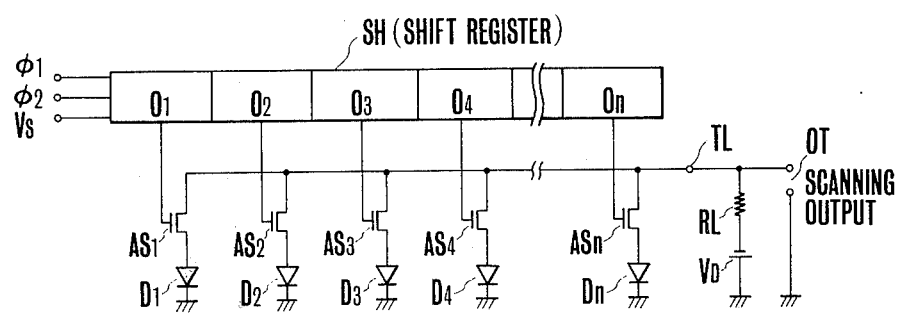
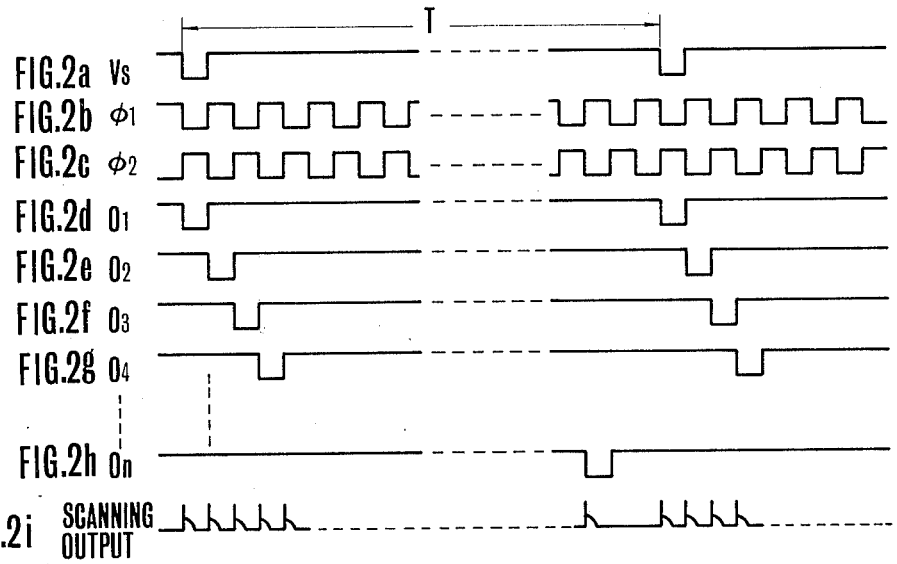

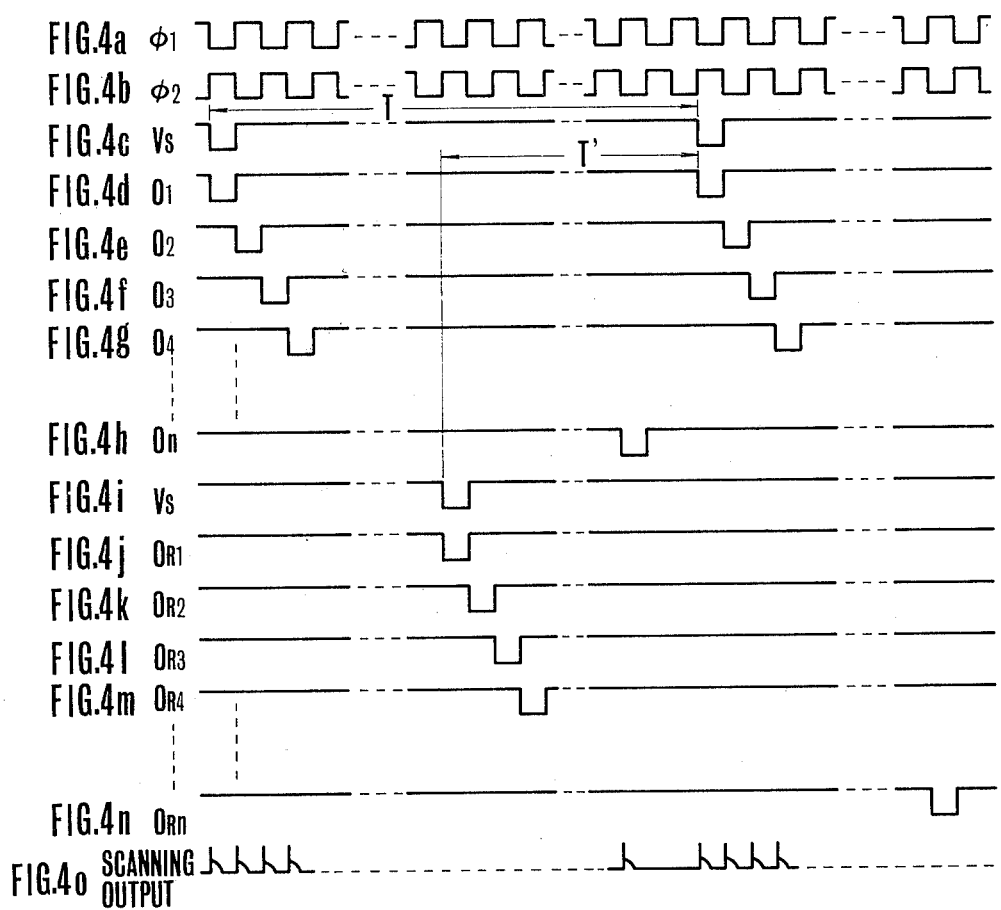

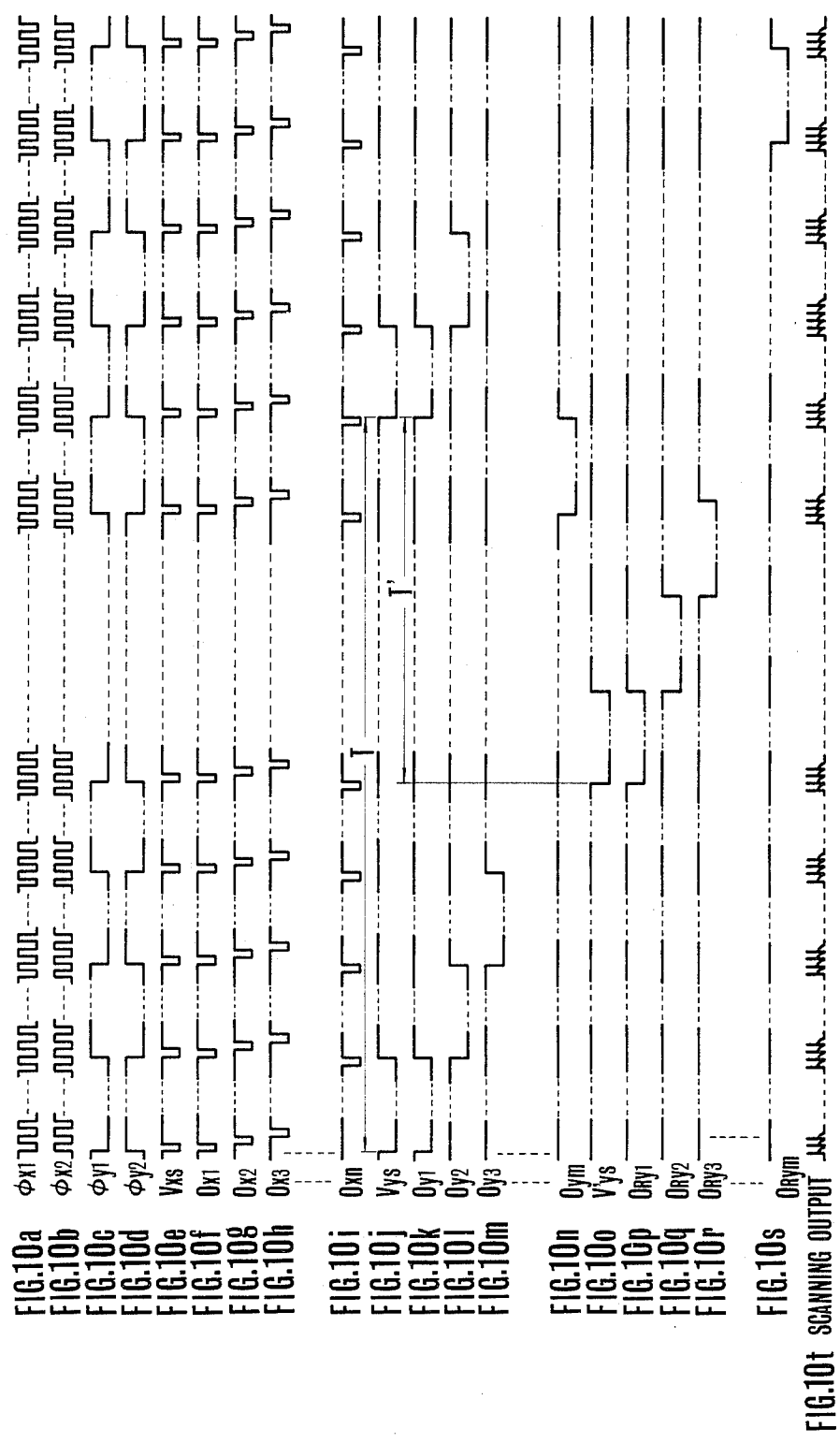

(a)

(b)

(a)

(b)

MOS-IMAGE SENSOR

BACKGROUND OF THE INVENTION

This invention relates to MOS-image sensors, particularly line-type or area-type sensors having a plurality of signal-integration photo-sensitive elements sequentially read out by controlling the operation of signal readout gate switches in response to a signal readout address arrangement.

In so-called self-scanning types of solid state image pickup devices, such as MOS-sensors, CCD-image sensors, and BBD-image sensors, the light information impinging thereon is integrated over a period of time and then read out. It is known that as the integration time is varied the response characteristic to incident light, that is the dynamic range, is extended to provide a scanning output (image pickup output level) proper for the incident light which may change over a wide range. Various methods of controlling this integration time have been proposed. For example, according to a typical proposal, the frequency of drive clock pulses which control the operation of the solid state image pickup device is varied to adjust the integration time. This is disclosed, for example, in Japanese Open Patent No. Sho 51-46019. According to another proposal, particularly suitable for CCD-image sensors or BBD-image sensors, the width of a carrier storage control pulse to be fed to the light receiving portions is made variable and the change of width adjusts the integration period, in this instance, the carrier storage period. This is disclosed in Japanese Open Patent Nos. Sho 50-62518 and Sho 50-92635.

These conventional methods of adjusting the integration time have a number of disadvantages. For example, varying the clock frequency changes the scanning frequency, and this automatically changes the output time of the scanning signal. Therefore, when used in television cameras, this arrangement fails to keep the output time of the scanning signal constant, and is hence, unsuitable for this purpose. Furthermore, reduction of the integration period involves increasing the scanning clock frequency, and because as is generally known, an increase in the scanning clock frequency causes deterioration of the efficiency of signal readout, it is impossible to increase the frequency to any great extent. Therefore, the adjustable time range is largely limited, particularly to shorter times. Another disadvantages arising from increasing the scanning clock frequency is that the amount of electrical energy consumed increases therewith. On the other hand, although making the width of the carrier storage pulse variable does eliminate some of these drawbacks, this method is applicable only to charge transfer type image sensors such as CCD-image sensors and BBD-image sensors. Carrier storage pulse width variation is entirely inapplicable to MOS-type image sensors.

SUMMARY OF THE INVENTION

An object of the invention is to improve image sensors.

Another object of the invention is to avoid the aforementioned disadvantages.

Still another object of the invention is to provide an image sensor, and particularly, an MOS-image sensor capable of permitting variation of the integration period of the photo information over a wide range of values without the aforementioned disadvantages.

Another object of the invention is to improve line type MOS-sensors.

Still another object of the invention is to improve area type MOS-image sensors.

According to a feature of this invention, these objects are achieved in whole or in part, in an MOS-image sensor having a plurality of signal-integrating type photo-sensitive elements arranged to be sequentially read out through respective gate switches controlled with signal readout address means, by providing each photo-sensitive element with a reset gate switch connected to a reset source and reset address means which control the reset gate switches.

According to another feature of the invention, the reset address means control the reset gate switches either independently of or in cooperation with the signal readout address means.

According to another feature of the invention, the reset gate switches reset the photo-sensitive elements a desired period of time prior to the readout of the photo-sensitive elements, thereby establishing the integration time of the photo-sensitive elements.

These features make it possible to control the signal-integration period of each of the photo-sensitive elements arbitrarily by resetting of the photo-sensitive elements. This signal-integration period can be shortened to any small value without suffering from the disadvantages occurring in conventional image sensors, that is, without limitation as to the shortness of the integration time, and without reducing the readout efficiency, or increasing the consumption of electrical energy. On the other hand, when the sensor is adjusted toward longer integration periods, even when the image sensor is used as an image pickup in a TV camera, the period can be adjusted to any value within one field or one frame. This advantage is obtained without changing the output time of the scanning signal. The integration period can be varied over a wide range of bands without undesirably influencing the scanning output, and can be easily adjusted to a desired value.

According to a preferred embodiment of the invention, a line-type MOS-image sensor comprises a line-like arrangement of a plurality of signal-integration type photo-sensitive elements, address means controlling the operation of readout gate switches to sequentially read out the integrated signals of the individual photo-sensitive elements, a plurality of reset gate switches corresponding in number to the photo-sensitive elements and connected to a reset source, and reset address means for controlling the gate switches so as to individually control the reset gate switches, and hence, the individual photo-sensitive elements at a desired time prior to the readout.

According to another feature of the invention as practiced in a preferred embodiment, the MOS-image sensor is of the area type comprising a matrix of a plurality of signal-integration type photo-sensitive elements, X-directional and Y-directional readout address means cooperating with each other to control the operation of signal readout switches which sequentially read out the integrated signals of the individual photo-sensitive elements, a plurality of reset control or reset switches corresponding in number to the photo-sensitive elements and connected to a reset source, and either Y-directional reset control address means coacting with the X-directional readout address means to operate the aforementioned reset switches at a desired time and thereby reset the individual photo-sensitive elements, or X-directional reset control means coacting with Y-directional readout address means for operating the control or reset switches at desired times so as to reset the individual photo-sensitive elements.

According to another feature of the invention, the reset switches are operated before the readout switches at a time gap equal to the desired integrating time.

By virtue of these features, the MOS-image sensor of the invention does not require substantial modification of conventional sensors, and yet, produces a remarkable number of advantages. It is capable of allowing for shortening the integration period of the photo information to any value without producing the disadvantages previously mentioned, and particularly, avoids the prior limitations to the dynamic range with respect to shorter periods, avoids deterioration of signal readout efficiency, and further obviates large increases in the consumption of electrical energy. On the other hand, it permits long periods of the type used in image pickups of TV cameras and allows adjustment to desired values within the limitations of one field period or one-frame period. This adjustment is not accompanied with variations in the output time of the scanning signal and thus makes it possible to vary the integration period over a wide range without undesired influence on the output time of the scanning signal to the desired values.

These features of the invention are pointed out in the claims. Other objects and advantages of the invention will become evident from the following detailed description when read in light of the accompanying drawings.

BRIEF DESCRIPTION OF THE DRAWINGS

In the drawings:

FIG. 1 is a schematic view showing the construction of a line type MOS-image sensor of the type to which the present invention is applicable;

FIGS. 2a to 2e are pulse diagrams showing the manner in which the line-type MOS-image sensor of FIG. 1 operates;

FIGS. 4a to 4o are pulse diagrams illustrating an example of the operation of the line-type MOS-image sensor of FIG. 3;

FIGS. 10a L to 10t are pulse diagrams illustrating an example of the operation of the area-type MOS-image sensor of FIG. 9;

DETAILED DESCRIPTION OF PREFERRED EMBODIMENTS

Figure 3:
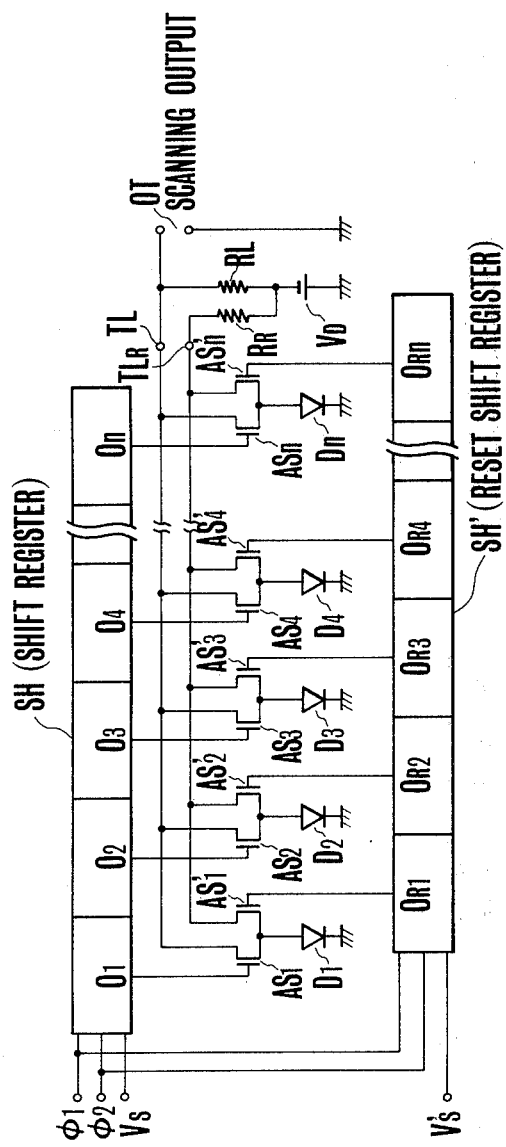
FIG. 3 is a schematic diagram illustrating one embodiment of the present invention using a line-type MOS-image sensor.

In FIG. 1, a conventional line-type MOS-image sensor is composed of a number of linearly arranged photodiodes D1 to Dn. A multiplicity of MOS-analog switches or gate switches AS1 to ASn serve to read out the signals from the photodiodes D1 to Dn. For this purpose, the gate switches AS1 to ASn have their respective sources connected to the respective photodiodes D1 to Dn and their respective drains connected to a load resistor RL through a common terminal TL. The opposite end of the load resistor RL is connected to a voltage source BP which energizes the various photodiodes. A signal readout n-bit MOS shift register SH forms respective outputs O1 to On connected to the respective control gates of the gate switches AS1 to ASn, and thereby control the opening and closing of each of the latter analog or gate switches.

The shift register SH is of the two-phase driven type and is responsive to drive clock pulses $\phi1$ and $\phi2$ of opposite phase as shown in FIGS. 2a to 2i. As is well known, all constituent elements described above are formed on a single semi-conductor MOS substrate.

In operation, the photodiode D1 to Dn of this line-type MOS-image sensor are fully charged or energized. When they are exposed to light, the charges stored on the photodiodes D1 to Dn are discharged to respective voltages dependent upon the amount of light incident thereon. The shift register SH, while being fed drive clock pulses $\phi1$ and $\phi2$ as shown in FIGS. 2b and 2c, receives a first start pulse Vs as shown in FIG. 2a. The pulse Vs is here assumed to be a negative-going pulse synchronized with a drive clock pulse $\phi1$, such that the two falling edges occur together. From this time on, as shown in FIGS. 2a to 2o, the various outputs O1–On of the shift register SH are successively changed to low pulses as if the start pulse Vs were shifted from the output stage O1 to the stage On in synchronism with the clock pulses $\phi1$ and $\phi2$. This causes the analog switches AS1 to ASn to be successively pulsed on. During the pulses, respective photodiodes D1 to Dn successively receive charging current from the battery VD and are fully recharged. During each pulse, the current required for each one of the photodiodes D1 to Dn to reach the fully charged state is equal to that needed to compensate for the part of the charge on that photodiode which was lost by exposure to light. This corresponds to the integrated value of the photo signal obtained as a scanning output in the form of a concurrent charging current through the output terminal OT. That is to say, the output voltage appearing at the terminal OT for each pulse represents the current needed to supply the charge that each diode had lost since the previous recharge, namely, the time-integrated charge from the previous recharge of each diode.

The integration time for each of the photodiodes D1 to Dn of the thus constructed line-type MOS-image sensor is the scanning repetition; that is, the time interval T from the declining edge of the start pulse Vs to that of the next start pulse Vs as shown in FIG. 2a. In the past, it has been the practice to vary the integration period by changing the frequency of the drive clock pulses $\phi 1$ and $\phi 2$. That is to say, the time interval between two successive start pulses Vs was determined on the basis of a predetermined relationship with the frequency of, for example, the drive clock pulses $\phi 1$. Therefore, a change in the frequency of the drive clock pulse $\phi 1$ automatically changes the time interval between the two successive start pulses Vs and resulted in a change of the integration period T. This type of adjustment, however, produced the aforementioned drawbacks.

It is also possible to change the integration period by changing the timed relation in which the start pulses Vs are fed with reference to a prescribed number of drive clock pulses $\phi 1$. However, even this does not eliminate the aforementioned disadvantages. As the integration time is changed, the output timing of the scanning signal is changed and the range of adjustment of the integration period is largely limited, particularly at shorter values. Also, it is impossible to extend the shorter limit beyond, for example, the period of a drive clock pulse $\phi 1$ multiplied by n/2 where n is the number of photodiodes.

FIG. 3 illustrates a line-type MOS-image sensor embodying features of the present invention. FIG. 3 differs from FIG. 1 in that each of the photodiodes D1 to Dn is provided with a resetting gate switch, namely, one of the MOS-analog switches AS'1 to AS'n. Each of the latter switches has a source connected to one of the diodes D1 to Dn and a drain connected to the battery VD through a terminal TLR and a resetting resistor RR. A resetting address device in the form of a two-phase driven-type n/bit MOS-shift register SH', similar in construction to the aforementioned signal readout shift register SH, controls the opening and closing of each of the resetting analog switches AS'1 to AS'n. The aforementioned drive clock pulses $\phi 1$ and $\phi 2$ drive the shift register SH' whose outputs OR1 to ORn control the gates of the resetting analog switches AS'1 to AS'n respectively.

In operation, drive clock pulses $\phi 1$ and $\phi 2$ drive the shift registers SH and SH' of the line-type MOS-image sensor in FIG. 3. During the drive clock pulses $\phi 1$ and $\phi 2$, the signal readout shift register SH receives signal readout start pulses Vs at a period T. That is, the scanning is recycled at each period T. In other words, a new scan is started at the beginning of each period T. The resetting shift register SH' receives negative-going resetting start pulses V's synchronized, for example, with the drive clock pulses $\phi 1$ at the falling edges thereof at an appropriate timed relationship as shown in FIG. 4a to 4p. The signal readout pulses Vs also go negative in synchronism with the same drive clock pulses $\phi 1$. When the shift register SH' receives a starting reset pulse V's, it starts to produce successive negative-going pulse outputs OR1 to ORn in synchronism with the drive clock pulses $\phi 1$ and $\phi 2$ as shown in FIGS. 4a, 4b, and 4j to 4o. Therefore, as the shift register SH' successively turns on the analog switches AS'1 to AS'n, the latter successively connect the photodiodes D1 to Dn with the battery VD. This recharges the diodes D1 to Dn to successively erase the thus-far stored photo signals. These recharges do not appear as signals at the output terminal OT.

After each diode has been recharged through each of the turned-on analog switches AS'1 to AS'n, the photodiodes D1 to Dn each discharge from the fully charged state at a rate depending upon the amount of light incident thereon. After that, when the signal readout shift register SH receives a signal readout start pulse Vs, the successive changes of the outputs O1 to On of the shift register SH cause the signal readout signal switches AS1 to ASn to turn on successively. This causes the photodiodes D1 to Dn again to draw recharge currents. These recharge currents pass through the resistor RL and produce time-seriated scanning outputs at the output terminal OT.

As a result of this operation, the integration period of each of the photodiodes D1 to Dn equals the time interval T' from the falling edge of the resetting start pulse V's to the falling edge of the subsequent signal readout start pulse Vs as shown in FIGS. 4a to 4o and, particularly, in FIGS. 4d and 4i. This construction of the line-type MOS-image sensor makes it possible arbitrarily to adjust the integration period over a range from a time equal to one period of the drive clock pulse $\phi 1$ to the scanning period T of the image sensor, merely by suitably varying the timing of the application of the clock-pulse-$\phi$-synchronized resetting start pulse V's to the resetting or reset shift register SH'.

The above construction does not require changing the frequency of the drive clock pulses $\phi 1$ and $\phi 2$ or modification of the interrelation of the signal readout start pulse Vs with the number of drive clock pulses $\phi 1$. Hence, the scanning period T remains unchanged despite the value of the integration period T'. Furthermore, the invention makes it possible to extend the range of adjustment of the integration period almost without limit to shorter values, for example, to one period of the drive clock pulse $\phi 1$. This occurs without reduction in the signal readout efficiency, increase in the amount of consumption of electrical energy, or similar drawbacks. This eliminates the disadvantages of conventional integrating period adjusting systems.

Figure 5A:
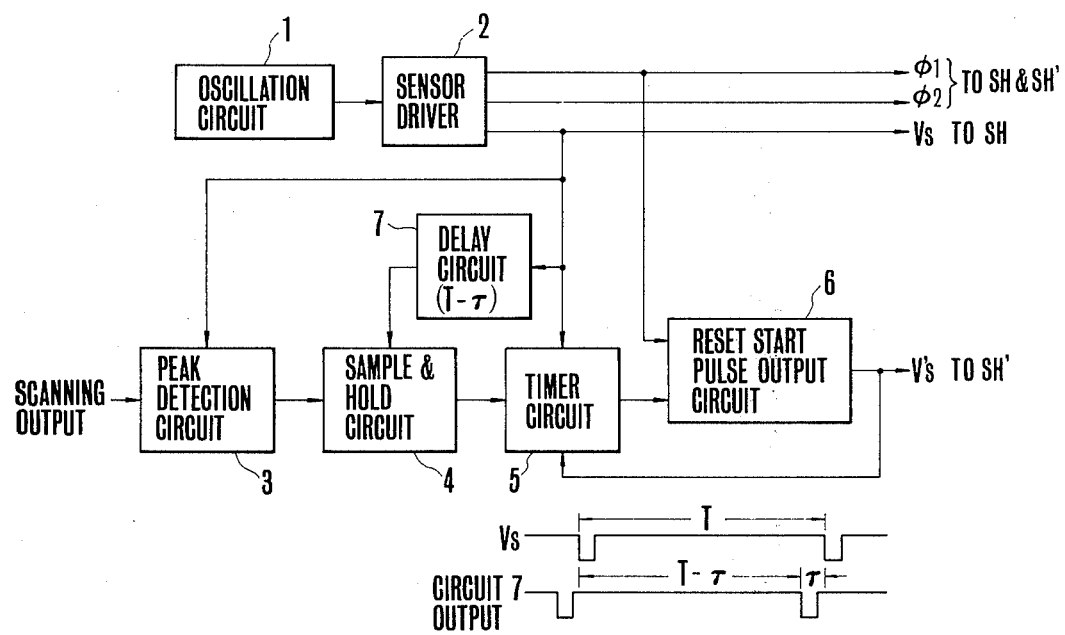
FIGS. 5a, 5b, 6a, and 6b are block diagrams illustrating four examples of automatic controls for the integration time of the sensor in FIG. 1, and embodying features of the invention.
Figure 5B:
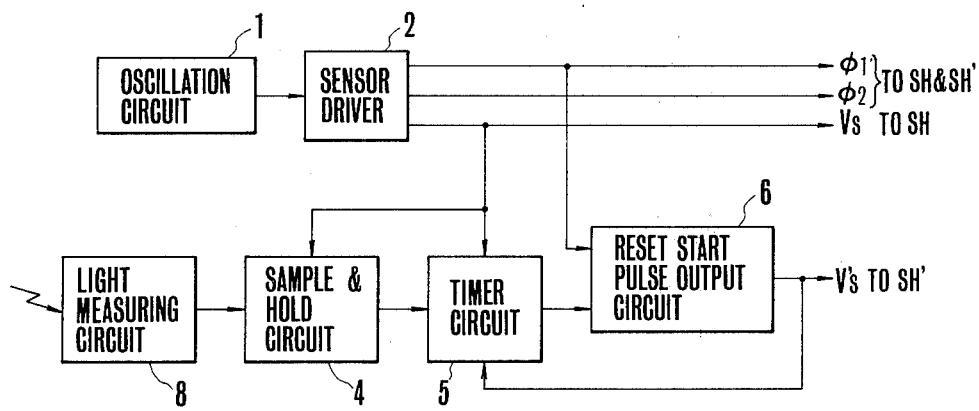

Circuits for automatically controlling the integration period in such line-type MOS-image sensors appear in FIGS. 5a and 5b as well as 6a and 6b. FIGS. 5a and 5b show two examples where the scan is recycled at a period T. Of these, the structure in FIG. 5a is adapted for automatic adjustment of the aforementioned integrating period T' in accordance with the level of the scanning output of the MOS-image sensor. In FIG. 5a, an oscillation circuit 1 produces a train of standard clock pulses. A sensor drive 2 receives the standard clock pulses from the oscillation circuit 1, divides the frequency, and shapes the waveform to produce drive clock pulses $\phi 1$ and $\phi 2$ and signal readout start pulses Vs having a period T. The drive clock pulses $\phi 1$ and $\phi 2$ are applied to the aforementioned shift registers SH and SH'. The signal readout start pulses Vs are applied to the signal readout shift register SH. A peak detecting circuit 3 receives the scanning output current from the aforementioned image sensor, namely, at the terminal OT, detects its peak value and produces a corresponding peak value output voltage. A sample and hold circuit 4 samples and holds the output voltage of the peak detecting circuit 3. A timer circuit 5 responds to the output voltage of the sample and hold circuit and forms a time signal proportional to the voltage value. A reset start pulse output circuit 6 responds to the output of the timer circuit 5 and the drive clock pulses $\phi 1$ from the sensor driver 2 for producing resetting start pulses V's in synchronism with the falling edge of that of the clock pulses $\phi 1$ which appears just after the time prescribed by the timer 5 has passed. Its output pulses are applied to the aforementioned reset shift register SH'.

The aforementioned peak detecting circuit 3 responds to the signal readout start pulse Vs from the sensor driver 2, and, after the detected value in the preceding cycle has been cleared by the pulse Vs, the circuit 3 again detects the peak value.

A delay circuit 7 receives the signal readout start pulse Vs and produces an output after a delay time $T-\tau$, where T is the scanning period and $\tau$ is extremely short compared with T. At that time, the sample and hold circuit 4 samples and holds the output of the peak value detecting circuit 3 occurring just before the clear. The timer circuit 5 starts its timing operation in response to the signal readout start pulse Vs and is reset by the resetting (or reset) start pulse V's.

In operation, a first signal readout start pulse Vs from the sensor driver 2 in FIG. 5a starts a readout cycle of the scanning signal as described. At this time, the peak detecting circuit 3 is cleared. It then detects the peak value of the scanning output and produces a corresponding signal in the form of a voltage value. At the time $T-\tau$, after the beginning of the first start pulse Vs, the delay circuit 7 produces a sampling pulse Ps which is applied to the sample and hold circuit 4. As a result, the concurrent output voltage of the peak detecting circuit is sampled and held by and in the sample and hold circuit 4.

Upon the lapse of the time $\tau$, after the beginning of the sampling pulse Ps, the sensor driver 2 produces a second signal readout pulse Vs. In response to the second pulse Vs, the timer circuit 5 starts to operate and forms a time signal dependent upon the output voltage of the sample and hold circuit 4. The second start pulse Vs again clears the peak detecting circuit 3 which then starts to detect a peak value of the scanning output in the next cycle.

After the start of the operation of the timer circuit 5 in response to the second signal readout start pulse Vs, and upon termination of the time established by the output of the sample and hold circuit 4, the timer circuit 5 changes its output. The resetting start pulse output circuit 6 then produces a first resetting or reset start pulse V's in synchronism with the falling edge of the next drive clock pulse $\phi 1$. From this time on, the individual photodiodes D1 to Dn are reset successively by being recharged as described. The reset start pulse V's also resets the timer circuit 5. Thereafter, when the sensor driver 2 produces a third signal readout start pulse Vs, the readout process of the scanning output is repeated. It should be noted that at a time $\tau$ earlier than the signal readout start pulse Vs, a pulse Ps causes the sample and hold circuit again to sample and hold the output of the peak detecting circuit 3. The timer circuit 5 responds to the start pulse Vs and begins to derive a new time on the basis of the output of the sample and hold circuit. At the same time, the peak detecting circuit 3, after being cleared, starts to detect the peak value of the scanning output in the next cycle. This procedure repeats itself.

In FIG. 5a, the time $T-T'$ from the signal readout signal pulse Vs to the reset start pulse V's is defined by the timer circuit 5 on the basis of the output of the sample and hold circuit 4, that is, the peak value of the scanning output obtained in the preceding cycle. The higher the peak level, the longer the time T minus T'; the lower the peak level, the shorter the time T minus T'. Because of the fixed scanning period T, the integration time T' is automatically adjusted on the basis of the peak level of the scanning output obtained in the preceding cycle. Hence, the higher the peak level, the shorter the integrating time T', and the lower the peak level, the longer the integrating time, with an accuracy to a unit equal to the period of the drive pulse $\phi 1$, and within the range of the scanning period T.

The timer circuit 5 includes a limiter that limits the longest defined time to T. According to an embodiment of the invention, the limiter is outside of the circuit 5.

FIG. 5b illustrates a circuit which adjusts the aforementioned integration period T' on the basis of a light value obtained from a separate light metering circuit. Here, a light metering circuit 8 produces an output in the form of a voltage corresponding to the level of the incident light. This output voltage is applied to the sample and hold circuit 4. The sample and hold circuit 4 is otherwise arranged on the basis of the signal readout start pulse Vs produced from the sensor driver 2 to sample the output of the light metering circuit. Except for the above, the circuit of FIG. 5b is similar to that of FIG. 5a.

In FIG. 5b, the time T minus T', that is, the time from production of the signal readout start pulse Vs to the production of the subsequent resetting start pulse V's, is adjusted by the timer circuit 5 in accordance with the output of the sample and hold circuit 4. In this instance, this is the output of the light metering circuit 8. The higher the light value, the longer is the time $T-T'$ and vice versa. Therefore, it follows that the integration period T' is automatically adjusted in accordance with the level of the incident light as detected by the light metering circuit 8. The higher the level of the incident light, the shorter is the integration time, and vice versa.

Figure 6A:
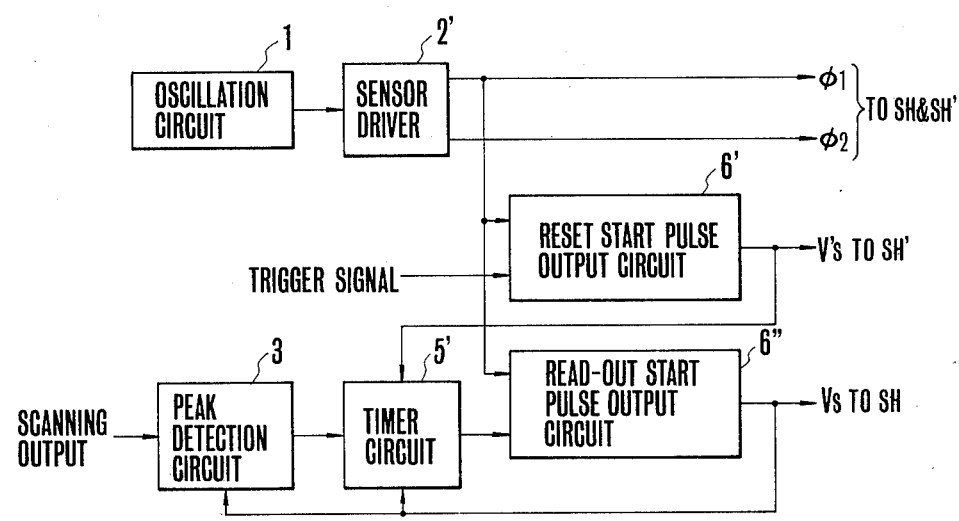
Figure 6B:
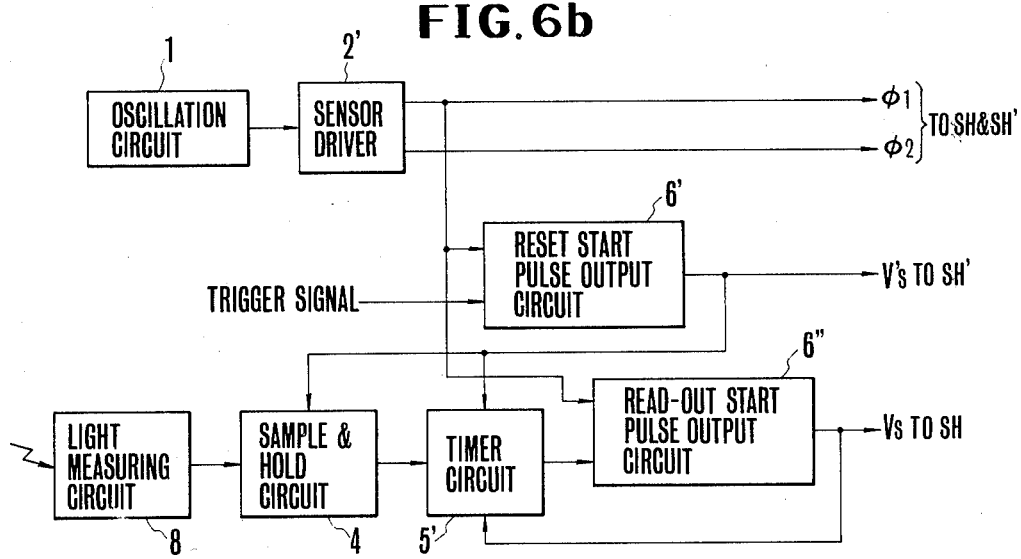

FIGS. 6a and 6b illustrate two embodiments of the invention wherein the scan is not recycled continuously over a predetermined period but a single scanning cycle operation is carried out with a desired timing. In FIG. 6a, similar to that of FIG. 5a, the circuit is adapted automatically to adjust the aforementioned integration period T' in accordance with the level of the scanning output of the image sensor. Here, a sensor driver 2' is similar to the sensor driver 2 of FIG. 5, except that only drive clock pulses $\phi 1$ and $\phi 2$ are produced. A reset start pulse output circuit 6' responds to the drive clock pulses $\phi 1$ from the sensor driver 2' and from a trigger signal from outside of the circuit, to produce a reset start pulse V's in synchronism with the falling edge of the first driver clock pulse $\phi 1$ which appears just after the trigger signal. A timer circuit 5' operates in a sense opposite to that of the timer circuit 5 of FIG. 5a; namely, it forms a time inversely proportional to the output voltage of the peak detecting circuit 3. A signal readout start pulse output circuit 6'' operates on the basis of the output of the timer circuit 5' and the drive clock pulses $\phi 1$ from the sensor driver 2' to produce a signal readout start pulse Vs in synchronism with the falling edge of the first drive clock pulse $\phi 1$ after elapse of the time defined by the timer circuit 5'.

The timer circuit 5' responds to the resetting start pulse V's from the resetting start pulse output circuit 6' to begin its time defining operation. On the other hand, the circuit 5' is reset by the signal output start pulse Vs from the signal readout start pulse output circuit 6''. The peak detecting circuit 3 is controlled so as again to detect the peak value after the thus-far detected value has been cleared by the signal readout start pulse Vs from the signal readout start pulse circuit 6''.

In operation, the peak detecting circuit 3 of FIG. 6a retains the voltage representative of the peak value of the last obtained scanning output. When the trigger pulse is applied to the start pulse output circuit 6' at an appropriate time, the start pulse output circuit 6' produces a resetting start pulse V's in synchronism with the falling edge of the next appearing drive clock pulse $\phi 1$ (namely, the one appearing just after application of the trigger pulse). This starts the successive resetting of the photodiodes D1 to Dn as previously mentioned. On the other hand, when the resetting start pulse V's is produced from the start pulse output circuit 6', the timer circuit 5' starts to operate in response thereto. The timer circuit 5', in contrast to the circuit in FIG. 5a, then defines a time inversely proportional to the output voltage of the peak detecting circuit 3. That is, the higher the output voltage of the peak detecting circuit 3, the shorter is the time defined, and vice versa. Then, when this defined time has passed, and the timer circuit 5' changes its output, the signal readout start pulse output circuit 6" produces a signal readout start pulse Vs in synchronism with the falling edge of the next drive clock pulse $\phi 1$ (namely, the one which appears just after the elapse of the time defined by the timer circuit 5'). This, as mentioned, causes start of the readout of the scanning output. When the signal readout start pulse Vs is produced, the timer circuit 5' is reset thereby. The peak value detecting circuit, after having once been cleared, again starts to detect the peak value of the scanning output subsequently read out.

Therefore, according to the structure of FIG. 6a, the timer interval from the production of the resetting start pulse V's to the production of the subsequent signal readout start pulse Vs, that is, the integration period T' is automatically adjusted by the timer circuit 5'. This is done in accordance with the peak value of the scanning output last obtained, so that the higher the peak value, the shorter is the adjusted integration time.

The circuit of FIG. 6b, similar to the circuit of FIG. 5, is adapted automatically to adjust the integration period T' in accordance with the output of the separate light metering circuit. As shown in FIG. 6b, unlike the circuit of FIG. 6a, which includes a peak detecting circuit 3, includes a light metering circuit 8. It also includes a sample and hold circuit similar to that shown in FIG. 5b. The sample and hold circuit 4 is controlled to sample and hold the output of the light metering circuit 8 in response to the resetting start pulse V's from the resetting start pulse output circuit 6'.

In the circuit of FIG. 6b, the integration period T' is automatically adjusted by the timer circuit 5' in accordance with the level of the incident light as sensed by the light metering circuit 8, so that the higher the light level, the shorter is the integration time, and vice versa.

Figure 7:
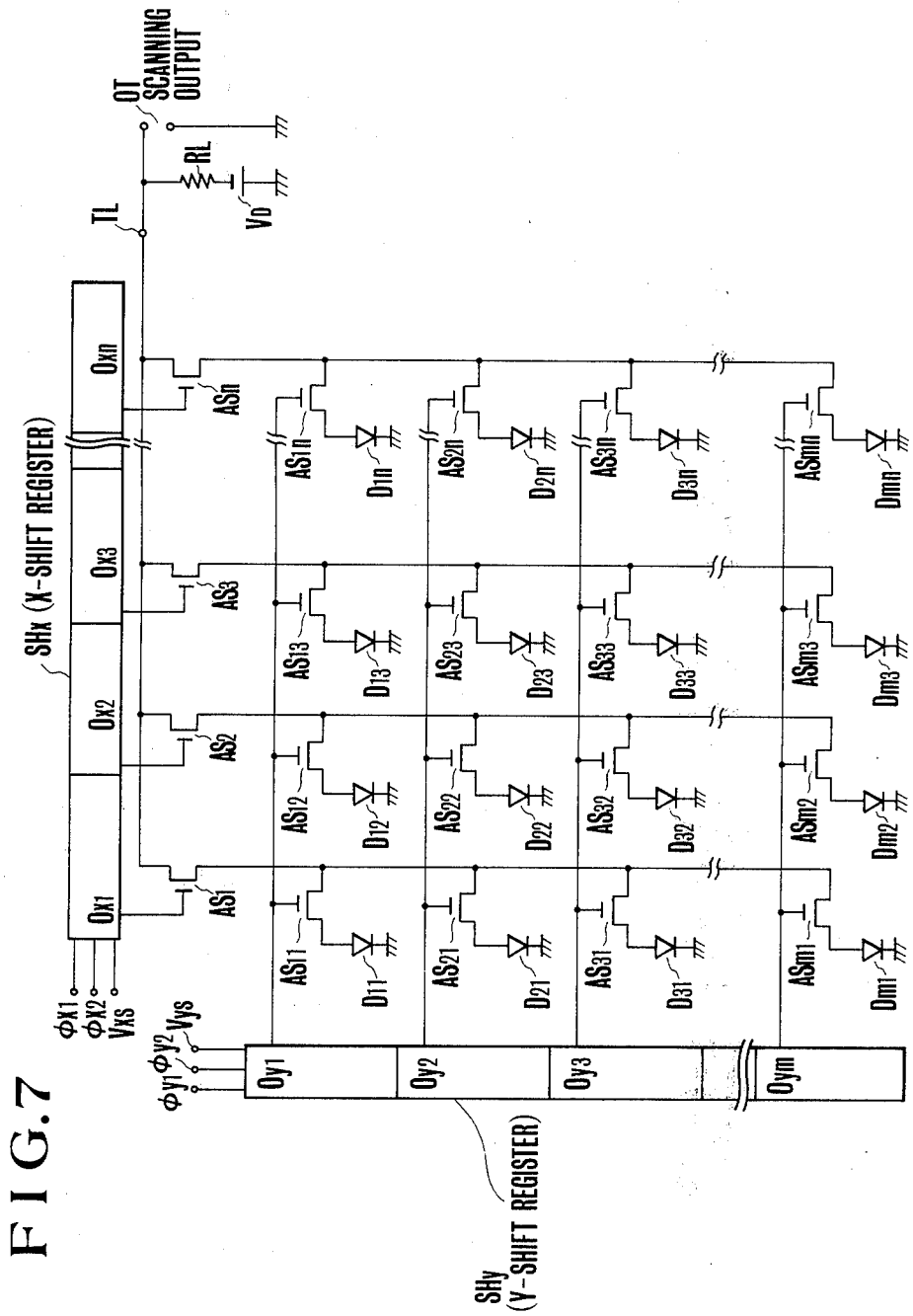
FIG. 7 is a schematic diagram showing the outline of the construction and arrangement of a prior art area-type MOS-image sensor to which the invention is applicable.

The invention may also be embodied as an area-type MOS-image sensor. FIG. 7 shows a known type MOS-image sensor. Here, photodiodes D11 to Dmn serve as photo-sensitive elements arranged in a matrix of m rows and n columns. MOS-analog, i.e. MOS-FET switches AS11 to ASmn serve as signal readout gate switches. These switches have their sources connected to respective individual photodiodes D11–Dmn and their drains connected in columns to the sources of MOS-analog, i.e. MOS-FET, switches AS1–ASn for operation by columns. The drains of the column selection switches AS1–ASn are connected through a terminal TL to a load resistor RL which is connected to an electrical power source.

A signal readout X-direction address device (X readout shift register SHx in the form of a n-bit MOS-shift register posses outputs Ox1–Oxn connected to the control gates of the column selection switches As1 to ASn for controlling the opening and closing operation of the latter. A Y-direction signal readout address device (y readout shift register) SHy in the form of an m-bit MOS-shift register possesses outputs Oy1 to Oym connected to the gates of switches AS11–ASmn in each row, that is, in respective rows AS1j, AS2j ... ASmj (j=1, 2, ..., n) and thereby controls the opening and closing of each individual row of the switches AS11 to Asmn.

Figure 8:
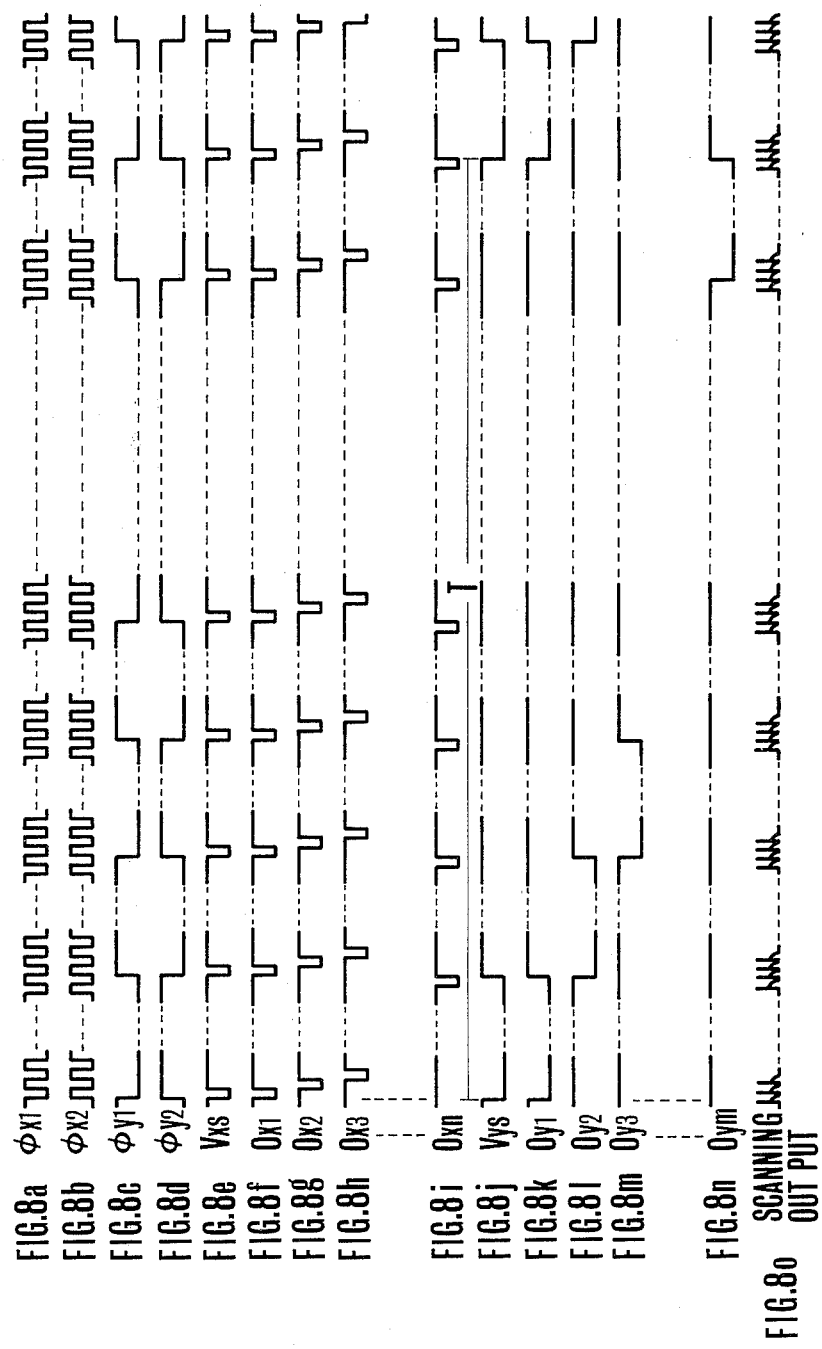
FIGS. 8a to 8o are pulse diagrams showing an example of the operation of the MOS-image sensor of FIG. 7.

The X-direction and Y-direction shift registers SHx and SHy are of the two-phase driven type. The X-direction shift register SHx is driven by two trains of clock pulses $\phi x1$ and $\phi x2$ of different phase as shown in FIGS. 8a and 8b. The Y-direction shift register SHy is driven by two trains of clock pulses $\phi y1$ and $\phi y2$ of opposite phase as shown in FIGS. 8c and 8d. The leading and trailing edges of the drive clock pulses $\phi y1$ and $\phi y2$ of the Y-direction (or Y-directional) shift register SHy are synchronized with the falling edges of the drive clock pulses $\phi x1$ of the X-direction shift register SHx, and have a period equal to n-times that of the drive clock pulses $\phi x1$; (that is, the period for two-line scanning). The X-direction start pulses Vxs for the X-direction shift register SHx are negative-going pulses whose leading edges are synchronized with the falling edges of the X-direction drive clock pulses $\phi x1$ as shown in FIG. 8e, and occur for every falling edge of the Y-direction drive clock pulses $\phi y1$ and $\phi y2$.

In operation, the X-direction shift register SHx is fed with drive clock pulses $\phi x1$ and $\phi x2$ and start pulses Vxs. The Y-direction shift register SHy receives drive clock pulses $\phi y1$ and $\phi y2$. When a negative-going Y-direction start pulse Vys, shown in FIG. 8j to have its leading edge synchronized with the falling edge of one of the drive clock pulses $\phi y1$, is applied to the Y-direction shift register SHy, the outputs Oy1 to Oym of the Y-direction shift register SHy successively produce negative-going pulses in synchronism with the drive clock pulses $\phi y1$ and $\phi y2$. Hence, the analog switches AS11 to Asmn in the individual rows AS1j, AS2j, ..., ASmj are successively turned on.

While one of the rows of the analog switches AS11 to ASmn remain on, the X-directional shift register responds to the start pulse Vxs by producing successive negative-going pulses in synchronism with the drive clock pulses $\phi x1$ and $\phi x2$. Hence, the column selection switches AS1 to ASn are each successively turned on one time.

As an example of this operation, the first output Oy1 of the Y-directional shift register goes low and turns the switches AS11 to AS1n on. The column selection switches AS1 to ASn are rendered conductive sequentially by the shift in the output of the X-direction shift register SHx. Under these circumstances, of the diodes D11 to Dmn, those in the first row, that is, the photodiodes D11 to D1n are successively recharged. Therefore, similar to the case of a line-type MOS-image sensor, the scanning outputs of the first row line are, at this time, sequentially obtained in the form of a current through the output terminal OT. Subsequently, shifting of the Y-direction shift register SHy shifts those of the switches AS11 to ASmn which are on from one row to another. Now the time-seriated conduction of the column selection switches AS1 to ASn caused by the shift of the X-direction register SHx permits the integrated data of the photodiodes D11 to Dmn to be serially read out row by row.

In view of the above, the integration period of each of the photodiodes D11 to Dmn in this type of area MOS-image sensor corresponds as in the line-type MOS-image sensor, to the repetitive scanning period. This scanning period constitutes the time interval from the falling edge of the Y-direction start pulse Vys of the Y-direction shift register SHy to the following falling edge as shown in FIG. 8j. Here, the time period is identified as T. To adjust this integration time, it has been the prior art practice to change the frequency of the X-direction drive clock pulses $\phi x1$ and $\phi x2$. This changes the frequency of the Y-directional drive clock pulses $\phi y1$ and $\phi y2$. A change in the time interval between successive two Y-direction start pulses Vys result. This conventional method effects the advantages which have previously been described.

Figure 9:
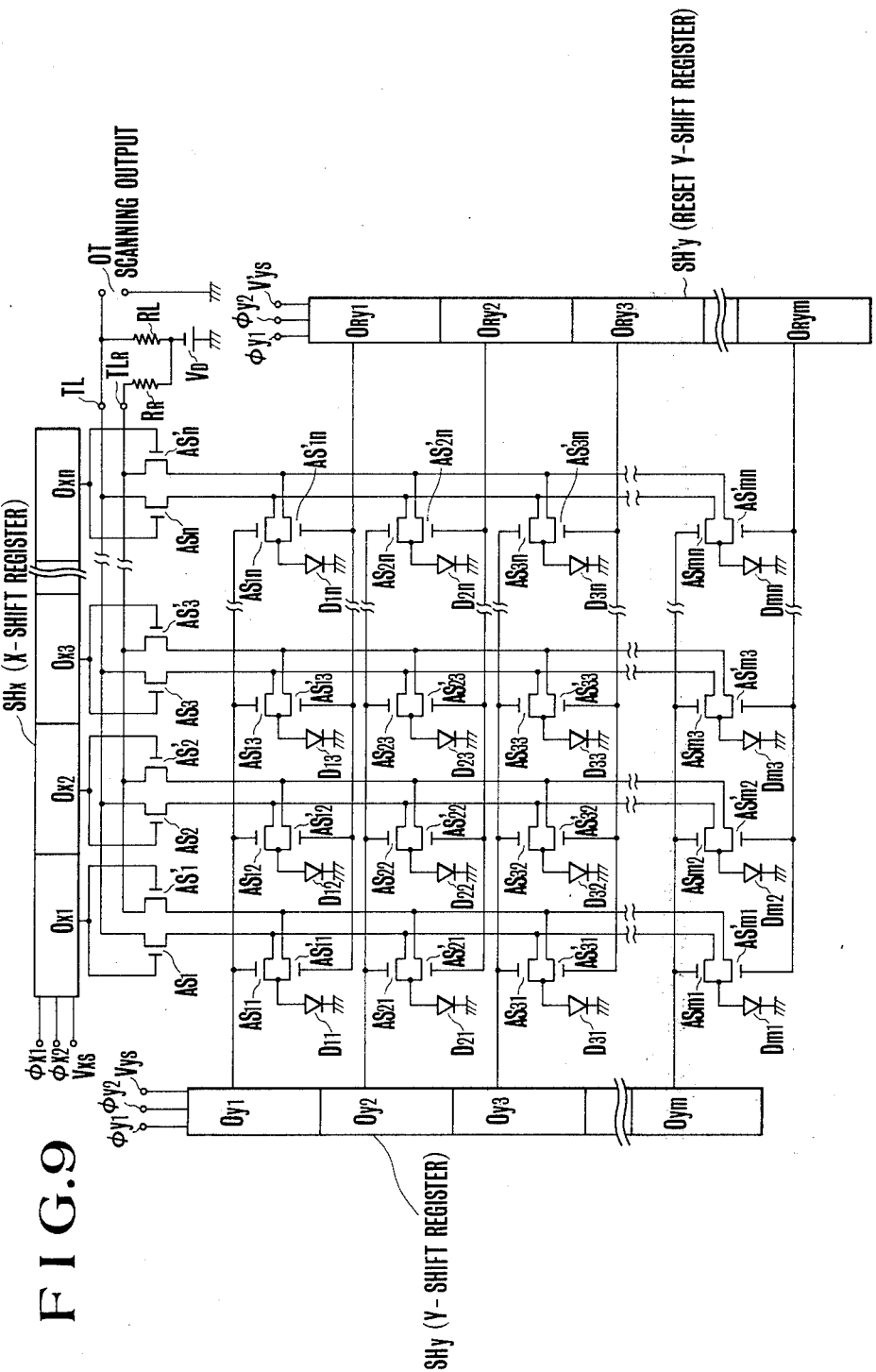
FIG. 9 is a schematic diagram illustrating an embodiment of the present invention.

FIG. 9 illustrates an area-type MOS-image sensor embodying features of the invention. This structure differs from that of FIG. 7 in that it includes a number of resetting gate switches (or resetting switches or reset switches) in the form of MOS-analog (MOS-FET) switches AS'11 to AS'mn corresponding in number to the photodiodes D11 to Dmn. The sources of the switches AS'11 to AS'mn are connected to respective photodiodes D11 to Dmn in combination with additional resetting gate switches (column reset or column selection switches) AS'1 to AS'n. The latter serve for column selection of the resetting switches AS'11 to AS'mn. The individual columns of the resetting switches AS'11 to AS'mn are connected at their drains to the respective sources of the resetting and column selection switches AS'1 to AS'n. On the other hand, the drains of the column selection switches AS'1 to AS'n are connected through a terminal TLR to a resetting resistor RR which is connected to an electrical power source VD.

The column selection switches AS'1-AS'n are controlled by the outputs Ox1-Oxn of the signal readout X-direction shift register SHx. At the same time, a resetting Y-direction address device controls the opening and closing operation of each individual row of the above-described resetting analog switches AS'-11-AS'mn. The resetting Y-direction address device is in the form of an m-bit two-phase driven type MOS-shift register (Y reset shift register) SH'y similar to the Y readout shift register SHy and is driven by the drive clock pulses $\phi y1$ and $\phi y2$. Hence, the outputs ORy1-ORyn of the resetting Y-direction shift register SH'y are applied to the control gates of the respective rows of the resetting switches AS'11-AS'mn, that is, those represented by AS'1j, AS'2j, ..., AS'mj (j=1, 2, ..., n).

In operation, the signal readout X-directional shift register SHx of this area-type MOS-image sensor is driven by the drive clock pulses $\phi x1$, $\phi x2$. The signal readout Y-direction shift register SHy and resetting Y-direction shift register SH'y are driven by the drive clock pulses $\phi y1$, $\phi y2$. The signal readout X-direction shift register SHx receives X-direction start pulses V-s of a period T/m. The signal readout Y-direction shift register SHy receives Y-direction start pulses Vys of a period of T, (that is, the scanning is recycled every period T). This is shown in FIGS. 10a to 10t. When a negative-going resetting start pulse V'ys is synchronized with the falling or declining edge of one of the Y-directional drive clock pulses $\phi y1$ (as is the signal readout Y-directional start pulse Vys) is applied to the resetting Y-directional shift register SH'y at an appropriate time, the outputs ORy1-ORym of the resetting Y-directional shift register SH'y produce successive negative-going pulses in synchronism with the drive clock pulses $\phi y1$, $\phi y2$ (as the resetting start pulse Y'ys shifts) as shown in FIGS. 10o to 10s. Hence, the resetting or reset switches AS'11-AS'mn are turned on row by row. That is, the switch rows represented by AS'1j, AS'2j, ..., AS'mj are turned on successively, one row at a time.

On the other hand, when one of the rows of the resetting switches AS'11-AS'mn is on, the resetting (reset) and column selection switches AS'1-AS'n are each successively turned on one time as the signal readout X-directional shift register SHx shifts its output. For example, the output ORy1 of the resetting Y-direction shift register SH'y may be low and the resetting switches AS'11-AS'1n on. The column selection analog switches AS'1-AS'n are then rendered successively conductive by the shift of the output of the signal readout X-direction shift register SHx. In that case, of the photodiodes D11-Dmn, those in the first row; namely, photodiodes D11-D1n, are recharged successively. Therefore, in these photodiodes D11-D1n, the thus-far accumulated data are erased successively, and the diodes reset. This procedure repeats itself for each of the subsequent rows of photodiodes D21-Dmn as the resetting Y-directional shift register SH'y shifts its output. This turns the resetting analog switches AS'21-ASmn on row by row.

After that, a signal readout Y-directional start pulse Vys is applied to the signal readout Y-directional shift register SHy. At this time, the readout of the accumulated data of the individual photodiodes D11-Dmn starts at the first row as mentioned. Therefore, the integration period of each of the photodiodes D11-Dmn is defined as shown in FIGS. 10j and 10k by the time interval T' from the declining edge of the resetting Y-directional start pulse V'ys to the declining edge of the next signal readout Y-directional start pulse Vys.

In an area-type MOS-image sensor of this construction, appropriate adjustment of the timing of application of the resetting Y-directional start pulse V'ys, synchronized with the Y-direction drive clock $\phi y1$ to the resetting Y-directional shift register SH'y, makes it possible to adjust the integration time stepwise over an arbitrary range, but within the scanning period T of said image sensor. Each step is a unit equal to one period of the Y-direction drive clock pulse $\phi y1$, that is, the period necessary to read out twice in the X-direction. This produces the same advantages as those resulting from the line-type MOS-image sensor of FIG. 3.

Figure 11A:
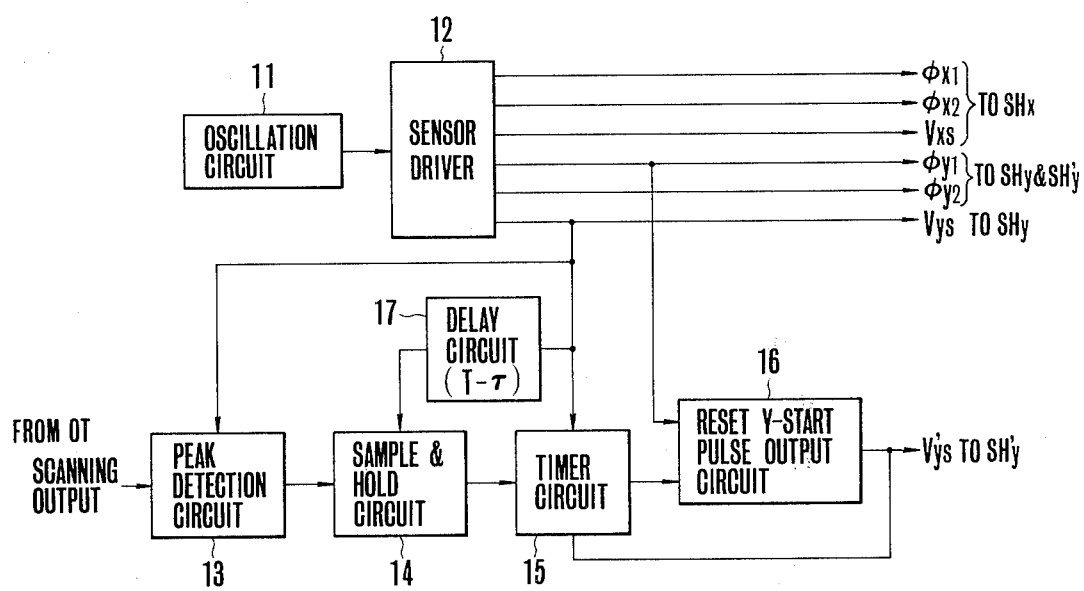
FIGS. 11a, 11b, 12a, and 12b are block diagrams showing four examples of circuitry for automatically controlling the integration time in the MOS-image sensor of FIG. 9, and embodying features of the invention.

FIGS. 11a to 12b show a number of circuits which automatically control the integration time of the area-type MOS-image sensor of FIG. 9, and which embody features of the invention. The circuit of FIG. 11a, like that used with the line-type MOS-image sensor of FIG. 3, recycles the scan at a period T. The circuit of FIG. 11a, like the circuit of FIG. 5a, automatically controls the integration time T' in accordance with the level of the scanning output. In FIG. 11a, an oscillation circuit produces standard clock pulses. A sensor driver 12 processes the standard clock pulses from the oscillation circuit 11 by dividing the frequency thereof and shaping the waveform thereof to produce X-directional (X-direction) drive clock pulses $\phi x1$ and $\phi x2$, X-direction start pulses Vxs, Y-directional (Y-direction) drive clock pulses $\phi y1$ and $\phi y2$, and Y-direction signal readout start pulses Vys of a period T. A peak detecting circuit 13 responds to the scanning output current from the image sensor to detect a peak value and provided in the form of a voltage. A sample and hold circuit 14 samples and holds the output voltage of the peak detecting circuit 13. A timer circuit 15 responds to the output of the sample and hold circuit to form a time signal proportional to the held value. A Y-direction resetting start pulse output circuit 16 responds to the output of the timer circuit 15 and the Y-direction drive clock pulses $\phi y1$ from the sensor driver 12 to produce Y-directional reset start pulses V'ys for the Y-direction shift register SH'y. These start pulses V'ys occur in synchronism with the descending edge of the drive clock pulse which appears just after passage of the time defined by the timer circuit 15.

The peak detecting circuit 13 is controlled so that when the Y-directional signal readout start pulse Vys is produced by the sensor driver 12, the thus-far detected value is cleared. After that, detection of the peak value is repeated. The sample and hold circuit cooperates with a delay circuit 17 that receives the Y-directional signal readout start pulse Vys and delays it for the time $T-\tau$. The sample and hold circuit 14 samples and holds the output of the peak value detecting circuit 13 occurring just before the latter is cleared. The timer circuit 15 responds to the Y-direction signal readout start pulse Vys to start its time defining operation and is reset by the Y-directional resetting start pulse V'ys.

The advantages of the circuit of FIG. 11a correspond to those of the circuit of FIG. 5a for the line-type MOS-image sensor of FIG. 3. Many aspects of the circuit of FIG. 11a, therefore, can be understood from the description of the circuit of FIG. 5a. The time interval $T-T'$ from the start of the Y-direction signal readout start pulse Vys to the start of the next Y-direction resetting start pulse V'ys is automatically controlled by the timer circuit 15. This occurs on the basis of the output of the sample and hold circuit 14, that is, the peak value of the scanning output last obtained. Hence, the higher the peak level, the longer the time interval, and vice versa. In this case, the scanning period is fixed. As a result, the integration time T' is automatically adjusted in accordance with the peak value of the scanning output last obtained. Hence, the higher the peak value, the shorter the integration time, and vice versa. The accuracy of adjustment is a unit equal to one period of the Y-direction drive clock pulse $\phi y1$ and the range of adjustment is within the scanning period T.

In FIG. 11a, the timer circuit 15 includes a limiter so as to establish the longest defined time T. According to another embodiment of the invention, the limiter is made separate from the timer T.

Figure 11B:
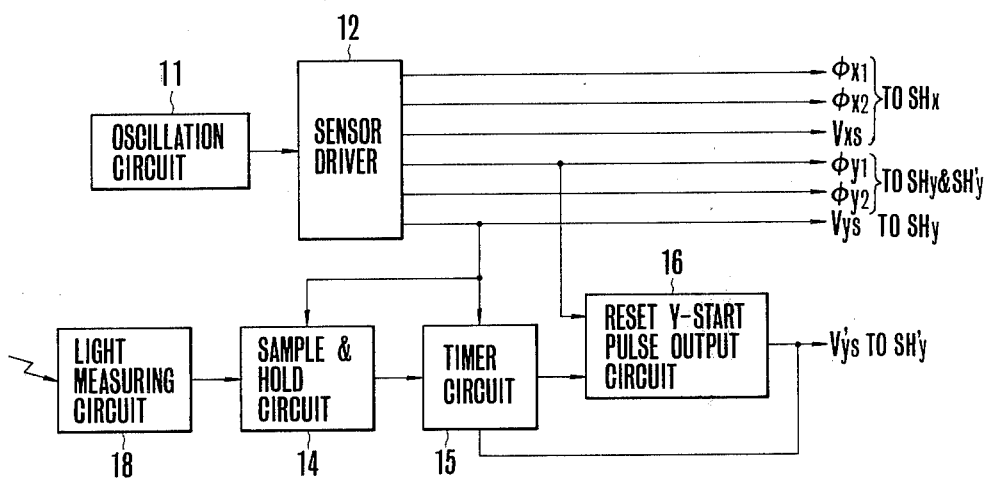

The circuit of FIG. 11b, like the circuit of FIG. 5b, is adapted automatically to adjust the integration period T' in accordance with the output of a separate light metering circuit. In FIG. 11b, a light metering circuit 18 produces an output voltage representing the level of the incident light. This output voltage is applied to the sample and hold circuit 14. The sample and hold circuit samples the output of the light metering circuit 18 on the basis of the Y-direction signal readout start pulse Vys produced by the sensor driver 12. With this exception, the circuit of FIG. 11b is similar to the circuit of FIG. 11a.

The circuit operation and advantages correspond to that of the circuit of FIG. 5b for the line-type MOS-image sensor of FIG. 3. In the circuit of FIG. 11b, as will be understood from the description of the circuit of FIG. 5b, the time interval $T-T'$, that is, the time interval from the production of the Y-direction signal readout start pulse Vys to the next Y-direction resetting start pulse V'ys is adjusted by the timer circuit 15 in accordance with the output of the sample and hold circuit 14. In this instance, this is the output of the light metering circuit 18. Hence, the higher the level of the incident light, the longer is the time interval T minus T', and vice versa. As a result, the integration period T' is automatically adjusted in accordance with the level of incident light as sensed by the light metering circuit 18. Hence, the higher the incident light, the shorter the integration time, and the lower the incident light, the longer the integration time.

Figure 12A:
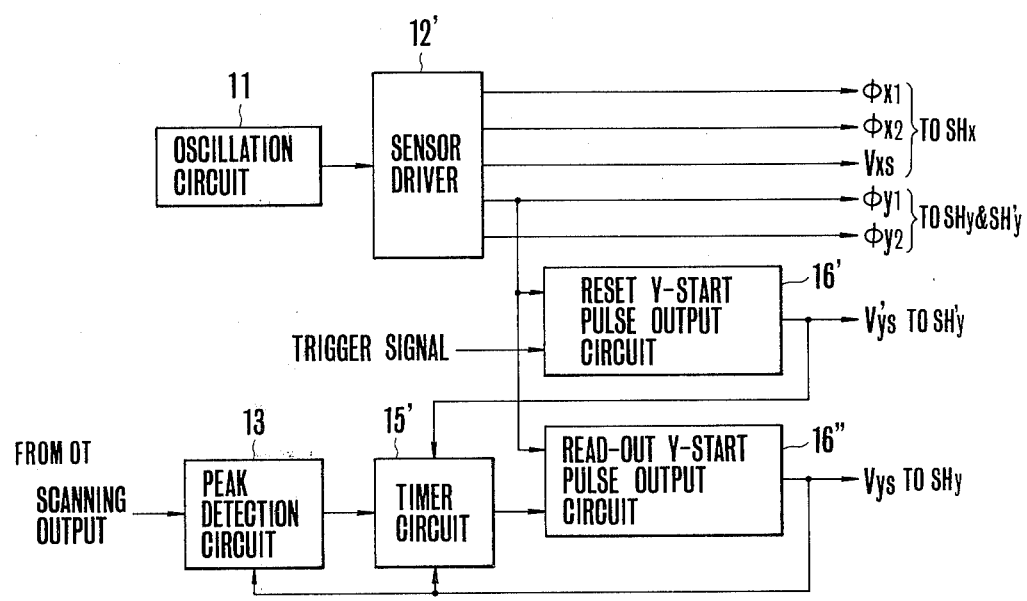
Figure 12B:
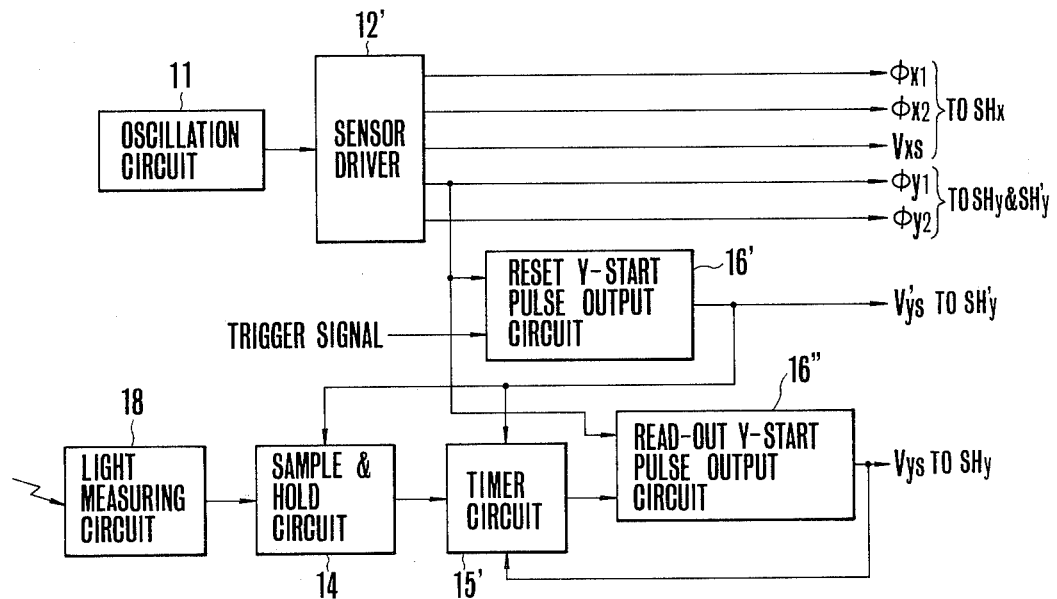

FIGS. 12a and 12b illustrate two embodiments which do not continuously recycle the scanning at a certain period. Rather, the circuits of FIGS. 12a and 12b carry out the scanning for the area-type MOS-image sensor of FIG. 9 for one shot at a desired timing similar to the manner in which the circuit of FIG. 6 performs this for the line-type MOS-image sensor of FIG. 3. The embodiment of FIG. 12a, like that of FIG. 6a, is adapted automatically to adjust the aforementioned integration period T' in accordance with the level of the scanning output of the image sensor. In FIG. 12a, a sensor driver 12' produces X-direction drive clock pulses $\phi x1$ and $\phi x2$, X-direction start pulses Vxs, and Y-direction drive clock pulses $\phi y1$ and $\phi y2$. The sensor 12' is similar to the sensor driver 12 of FIG. 11a with the exception that it does not produce the Y-direction signal readout start pulses Vys, but produces only the pulses $\phi x1$ and $\phi x2$, Vxs, $\phi y1$, and $\phi y2$. A Y-direction reset (Y-directional resetting) start pulse output circuit 16' responds to an outside trigger signal and the Y-direction drive clock pulses $\phi y1$ from the sensor driver 12' and produces the aforementioned Y-direction resetting start pulse V'ys in synchronism with the declining edge of the drive clock pulses $\phi y1$. The latter appeared just after the trigger signal was applied.

A timer circuit 15' operates in a sense opposite to that of the timer circuit 15 of FIG. 11a. It forms a time signal inversely proportional to the output voltage of the peak detecting circuit 13. A Y-directional signal readout start pulse output circuit 16" produces a Y-direction signal readout start pulse Vys. It accomplishes this on the basis of the output of the timer circuit 15' and the Y-direction drive clock pulses $\phi y1$ from the sensor 12' in synchronism with the falling edge of that one of the drive clock pulses $\phi y1$ which occurs just after the time defined by the timer circuit 15'.

The timer circuit 15' starts its time defining operation on the basis of the Y-direction reset start pulse V'ys from the Y-direction reset start pulse output circuit 16'. On the other hand, the Y-direction signal readout start pulse Vys from the Y-direction signal readout start pulse output circuit 16" resets the circuit 15'. The peak detecting circuit 13 operates such that when the Y-direction signal readout start pulse output circuit 16" produces a Y-direction signal readout start pulse Vys, the thus-far detected value is cleared and the circuit then again proceeds to detect a peak value.

The operation, structure and advantages of the circuit of FIG. 12a correspond to those of the circuit in FIG. 6a. In FIG. 12a, as will be understood from the description of the circuit in FIG. 6a, the time interval from production of the Y-direction resetting start pulse V'ys to the next Y-direction signal readout start pulse Vys, that is, the integration period T', is automatically adjusted by the timer circuit 15'. This is done in accordance with the peak value of the scanning output last obtained. Hence, the higher the peak value, the shorter is the period T', and the lower the peak value, the longer the period T'.

FIG. 12b illustrates an embodiment, similar to that of FIG. 6b, adapted automatically to adjust the integration period T' in accordance with the output of a separate light metering circuit. The circuit of FIG. 12b, unlike the circuit of FIG. 12a, instead of using a peak detecting circuit 13, utilizes a light metering circuit 18 and a sample and hold circuit 14 as in FIG. 11b. The sample and hold circuit 14 responds to the Y-direction reset start pulse V'ys from the Y-direction reset start pulse output circuit 16' to sample and hold the output of the light metering circuit 18.

In FIG. 12b, the integration period T' is automatically adjusted by the timer circuit 15' in accordance with the level of the incident light detected by the light metering circuit 18. Hence, the higher the level of the incident light, the shorter the integration time T', and the lower the level of the incident light, the higher the integration time T'.

Figure 13:
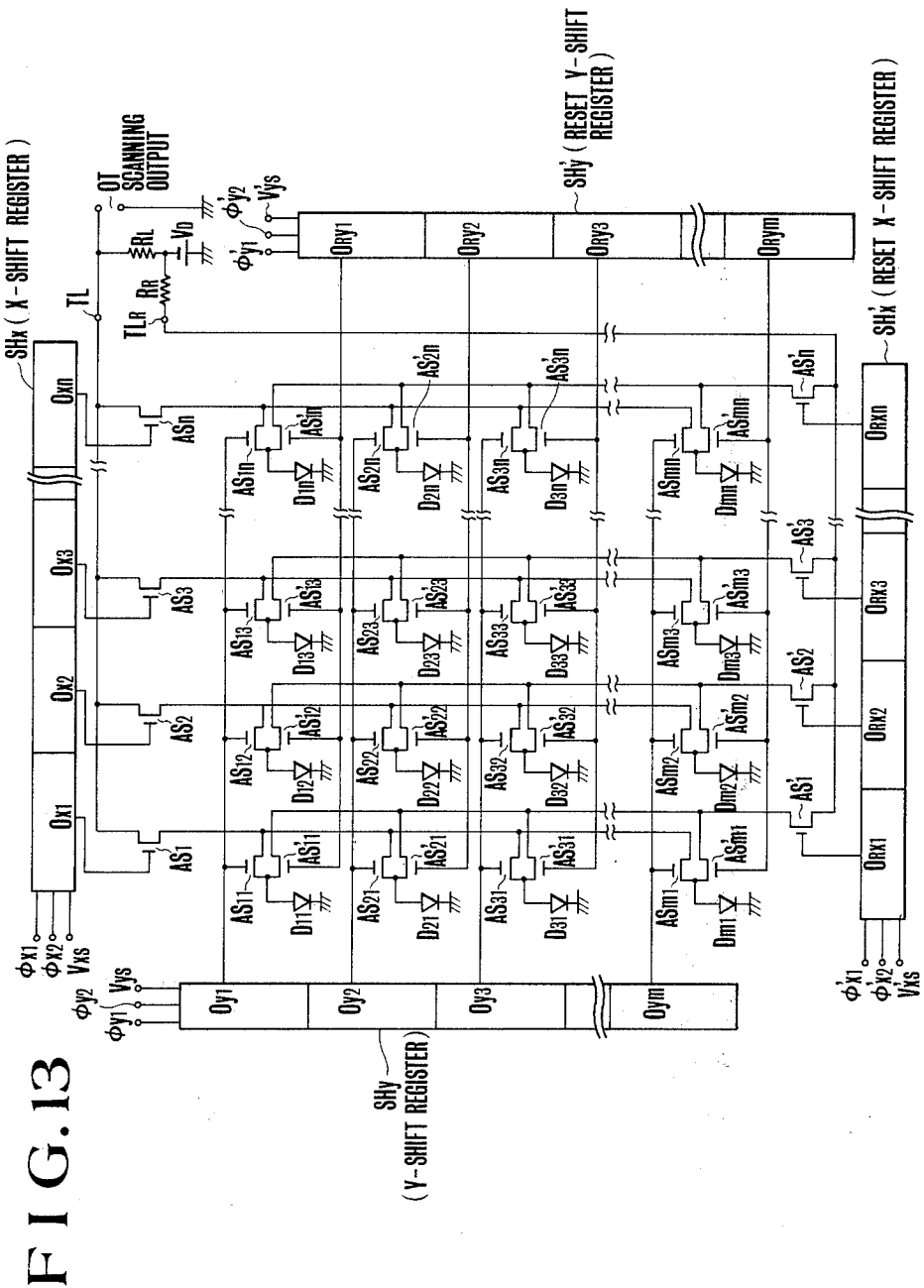
FIG. 13 is a schematic diagram of another embodiment of the present invention.

FIG. 13 illustrates another MOS-image sensor embodying features of the invention. The area-type MOS-image sensor of FIG. 13 includes the constituent elements of FIG. 9 with an X-direction reset (X-directional resetting) address device in the form of an n-bit two-phase driven type MOS-shift register SH'x similar to the X-direction signal readout shift register SHx. The shift register SH'x controls the opening and closing operation of the reset column selection switches AS'1 to AS'n whose control gates are connected to the respective outputs ORx1 to ORxn of the X-direction reset shift register SH'x. The X-direction reset shift register SH'x and the Y-direction reset shift register SH'y rather than receiving respective signal readout drive clock pulses $\phi$x1, $\phi$x2 and $\phi$y1, $\phi$y2, as well as signal readout start pulses Vxs, Vys, receive different reset drive clock pulses $\phi'$x1, $\phi'$x2 and $\phi'$y1, $\phi'$y2, and reset start pulses V'xs and V'ys.

In operation, it is assumed that the readout of the scanning output of the area-type MOS-image sensor of FIG. 13 is being recycled at a period T. When the X-direction reset drive clock pulses $\phi'$x1 and $\phi'$x2 and the X-direction reset start pulse V'xs are applied to the X-direction reset shift register SH'x and the Y-direction reset drive clock pulses $\phi'$y1 and $\phi'$y2 and the Y-direction reset start pulses V'ys are applied to the Y-directional reset shift register SH'y, the reset analog switches AS'11 to AS'mn and AS'1 to AS'n start to open and close in the manner similar to that aforementioned. This successively resets the photodiodes D11 to Dmn. Changing the timing of the application of the reset drive clock pulses $\phi'$x1, $\phi'$x2 and $\phi'$y1, $\phi'$y2, as well as the reset start pulses V'xs, V'ys to the reset shift registers SH'x and SH'y makes it possible to change the integration time (period) T' of each of the photodiodes D11 to Dmn. According to an embodiment of the invention, the reset shift registers SH'x and SH'y are actuated independent of the signal readout shift registers SHx and SHy in order to reset the individual diodes D11 to Dmn. Therefore, unlike the circuit of FIG. 9, the integration time T' can be adjusted to a finer value than otherwise in that it requires no relation to the period of the drive clock pulse $\phi$y1.

In this case, each time relation of the reset drive clock pulses $\phi'$x1, $\phi'$x2; $\phi'$y1, $\phi'$y2 and reset start pulses V'xs; V'ys for the shift registers SH'x and SH'y is the same as that of the signal readout drive clock pulses $\phi$x1, $\phi$x2; $\phi$y1, $\phi$y2 and the signal readout start pulses Vxs; Vys for the signal readout shift registers SHx and SHy. The frequency of the X-direction reset drive clock pulses (X-reset pulses) $\phi'$x1, $\phi'$x2 is the same as that for the X-direction signal readout drive clock pulses (X-readout pulses) $\phi$x1, $\phi$x2.

Figure 14:
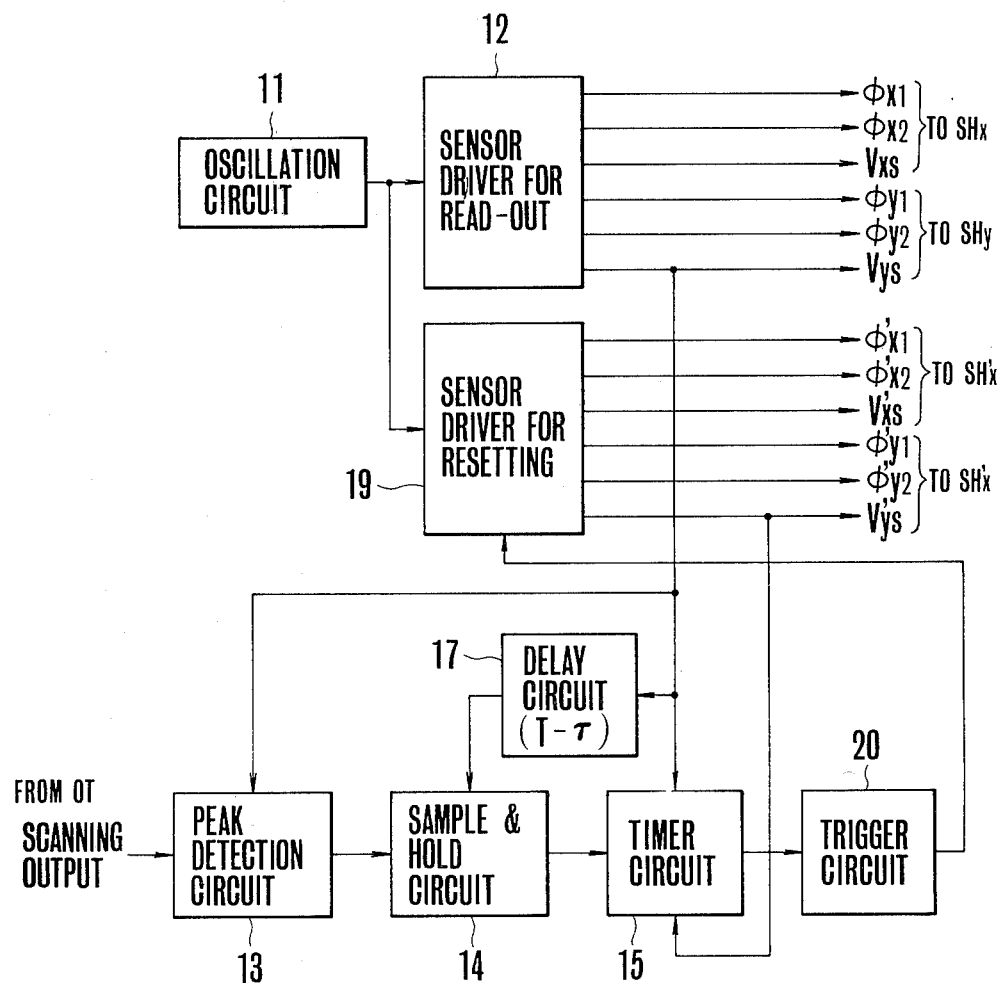
FIGS. 14a, 14b, 15a, and 15b are block diagrams showing four examples of the automatic control for the integration time usable with the MOS-image sensor of FIG. 13, and embodying features of the invention.
Figure 14:
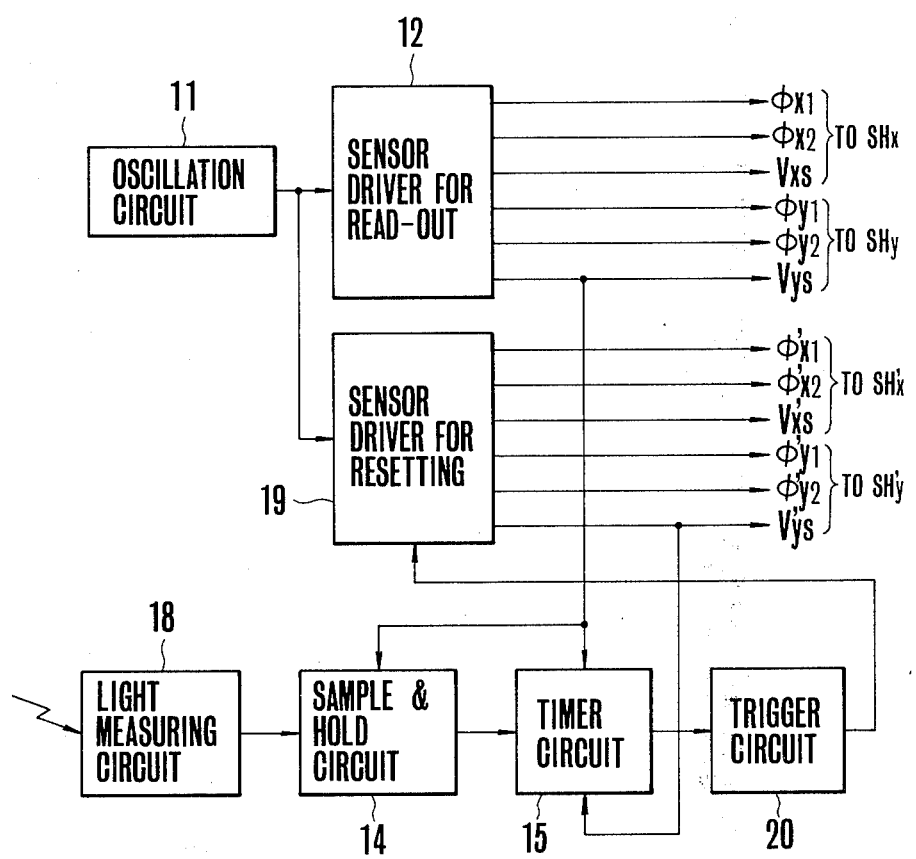

FIGS. 14a to 15b illustrate circuits for automatically controlling the integration time of the area-type MOS-image sensor of FIG. 13, and embody features of the invention. FIGS. 14a and 14b illustrate two examples for recycling the scanning at a period T similar to the manner in which the circuits of FIGS. 11a and 11b operated with the area-type MOS-image sensor of FIG. 9. The circuit of FIG. 14a, like the circuit of FIG. 11a, is adapted automatically to adjust the integration period (time) T' in accordance with the level of the scanning output of the image sensor. In FIG. 14a, a resetting (reset) sensor driver 19 responds to a trigger signal for starting to produce resetting (reset) drive clock pulses $\phi'$x1, $\phi'$x2; $\phi'$y1, $\phi'$y2 and reset (resetting) start pulses V'xs; V'ys for the reset shift registers SH'x and SH'y on the basis of these standard clock pulses from an oscillator or oscillation circuit 11. A trigger circuit 20 responsive to the output of a timer circuit 15 produces a trigger signal upon elapse of the time defined by the timer circuit 15. The trigger circuit 20 triggers the sensor driver 19. With the exception of the aforementioned, the circuit of FIG. 14a is the same as that of FIG. 11a.

In FIG. 14a, the time interval from the production of the Y-directional signal readout start pulse (Y-readout pulse) Vys from the signal readout sensor driver 12 to the triggering of the resetting (reset) sensor driver 19 by the trigger circuit 20 is automatically adjusted by the timer circuit 15 in accordance with the output of the sample and hold circuit 14. That is, the time interval is adjusted in response to the peak value of the scanning output last obtained so that the higher the peak level, the longer the time, and the lower the peak level, the shorter the time. As a result, the integration time T' is automatically adjusted so that the higher the peak value level of the scanning output last obtained, the shorter the integration period, and the lower, the longer.

The embodiment of FIG. 14b, like the embodiment of FIG. 11b, as adapted automatically to adjust the integration period T' in accordance with a separate light metering circuit. In FIG. 14b, reference characters corresponding to those of FIGS. 11b and 14a denote like circuit blocks.

In FIG. 14b, the time interval from the production of the Y-readout pulse Vys from the signal readout sensor driver 12 to the triggering of the reset sensor driver 19 by the trigger circuit 20 is automatically adjusted by the timer circuit 15 in accordance with the output of the sample and hold circuit 14. In this instance, the latter output is the output of the light metering circuit 18. Hence, the higher the level of the output of the light metering circuit 18, the longer is the time interval, and the lower the level, the shorter the time interval. As a result, the integration period T' is automatically adjusted in accordance with the level of the incident light as sensed by the light metering circuit 18. Hence, the higher the level of the incident light, the shorter the integration time T', and the lower, the longer.

FIGS. 15a and 15b illustrate two embodiments which, like those of FIGS. 12a and 12b for the area-type MOS-image sensor of FIG. 9, operate with the circuit of FIG. 13 in such a manner that the scanning is not continuously recycled at a constant period but carried out for one shot at a desired timing. In FIG. 15a, like the example illustrated in FIG. 12a, the circuit is adapted automatically to adjust the integration period T' on the basis of the level of the scanning output of the image sensor. In FIG. 15a, a sensor driver 12'' is similar to the signal readout sensor driver 12. However, the sensor 12'' is different in that, upon application of a trigger signal from the trigger circuit 20, it starts to produce signal readout drive clock pulses φx1, φx2; φy1, φy2 and signal readout start pulses Vxs; Vys for the signal readout shift registers SHx and SHy on the basis of the standard clock pulses from the oscillation circuit 11. The sensor driver 19 responds to an outside trigger signal to start producing the resetting drive clock pulses φ'x1, φ'x2; φ'y1, φ'y2 and resetting start pulses V'xs; V'ys. Except for the above, the circuit of FIG. 15a is similar in construction to that of FIG. 12a.

By virtue of this structure, the time interval after the driver 19 has been triggered by the outside trigger signal until the signal readout sensor driver 12' is triggered by the trigger circuit 20 is automatically adjusted by the timer circuit 15 in accordance with the peak level of the scanning output last obtained. Hence, the higher the peak level, the shorter is the time interval, and the lower the peak level, the longer the time interval. As a result, the integration period T' is automatically adjusted in accordance with the peak level of the scanning output last obtained, so that the higher the peak level, the shorter is the integration time T', and the lower the peak level, the longer the integration time T'.

Figure 15:
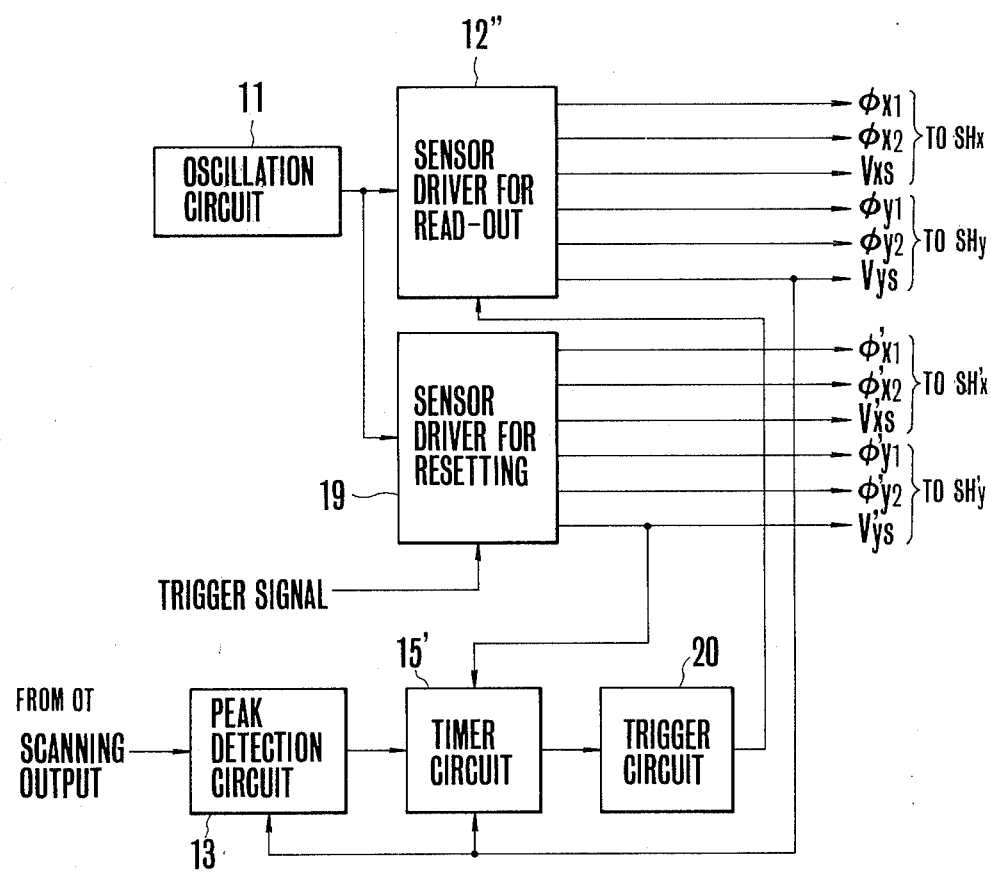
Figure 15:
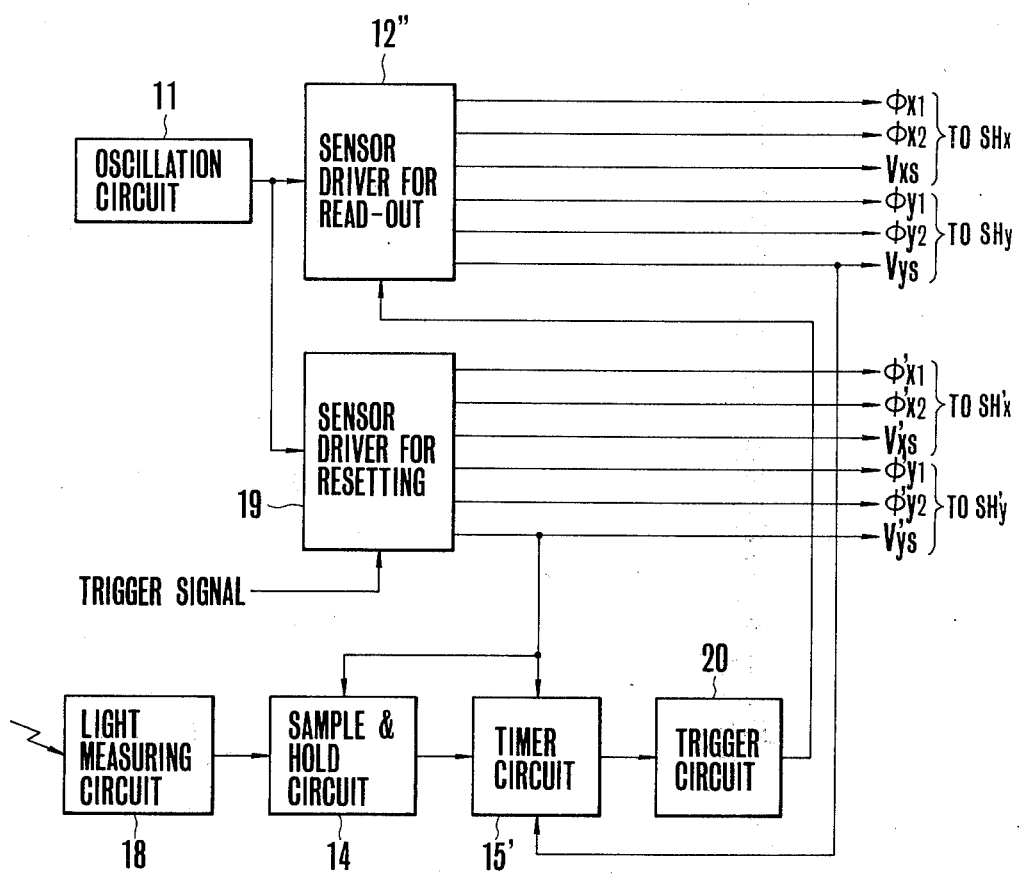

Like the embodiment illustrated in FIG. 12b, the embodiment of FIG. 15 automatically adjusts the integration period of the circuit in FIG. 13 in accordance with the output of a separate light metering circuit. In FIG. 15b, reference characters corresponding to those in FIG. 12b denote like circuit blocks.

In FIG. 15b, the time interval after the driver 19 has been triggered by an outside trigger signal until the driver 12' is triggered by the trigger circuit 20 is automatically adjusted by the timer circuit 15' on the basis of the output of the sample and hold circuit 14. In this instance, this corresponds to the output of the light metering circuit 18. The higher the output of the circuit 14, the shorter is the time interval, and the lower the output of the circuit 14, the longer is the time interval. As a result, the integration time is automatically adjusted in accordance with the level of incident light detected by the light metering circuit. Hence, the higher the light detected, the shorter is the integration time T, and the lower the level of incident light, the longer is the integration period T.

The present invention has been described in connection with embodiments using line-type MOS-image sensors and area-type MOS-image sensors. As will be understood from the description of these embodiments, the signal integration period of MOS-image sensors according to the present invention can be varied over a wide range which may be extended to any small value without limit, particularly, at shorter times, without accompanying drawbacks, such as reduction of the signal readout efficiency or increase in the amount of consumption of electrical energy. On the other hand, at the longer end of the range, when this image sensor is utilized, for example, as the image pickup unit of a TV camera or the like, the integration period can be adjusted to any desired value within the prescribed one-field period or one-frame period. Moreover, such an adjustment can be effected without causing changes in the output time of the scanning signals. The present invention affords the very great advantage of making the integration period variable over a wide range and making it adjustable to any desired value in a simple manner without undesirable influences on the scanning output.

The term MOS-analog switches used in this specification are represented by MOS-FET switches.

In the embodiments of the automatic integration item control circuit system shown in FIGS. 6a, 6b, 12a, 12b, 15a and 15b, the outside trigger signal is given through a manually operable external switch connected to the circuit system.

What is claimed is:

1. In a solid state linear MOS-image sensor comprising:
    a one-dimensional array of a plurality of radiation sensitive elements each responsive to radiation and each integrating and storing electrical information relating to received radiation;
    a readout switching arrangement coupled to each of said elements for reading out electrical information stored in the respective elements; and
    readout switching control means coupled to said readout switching arrangement for controlling the readout switching arrangement so as to read out electrical information stored in the respective elements in a time-seriated manner;
    the improvement comprising:
    a reset switching arrangement coupled to each of said elements for resetting the respective elements; and
    reset switching control means coupled to said reset switching arrangement for controlling the reset switching arrangement so as to reset the respective elements in a time-seriated manner.

2. The improvement according to claim 1, wherein said reset switching arrangement includes a plurality of MOS-analog switches each respectively coupled to one of said elements.

3. The improvement according to claims 1 or 2, wherein said reset switching control means includes an MOS-shift register operable in response to pulse signals supplied for controlling said reset switching arrangement so as to reset the respective elements in a time-seriated manner.

4. The improvement according to claims 1 or 2, wherein said readout switching control means includes pulse controlled means controlled by predetermined pulse signals having a predetermined frequency for reading out electrical information stored in the respective elements in a time-seriated manner at said predetermined frequency, and said reset switching control means includes pulse controlled means which is controlled by said predetermined pulse signals for resetting the respective elements in a time-seriated manner at said predetermined frequency.

5. In a solid state areal MOS-image sensor comprising:
    a two-dimensional array of a plurality of radiation sensitive elements each responsive to radiation and each integrating and storing electrical information relating to received radiation;

a readout switching arrangement coupled to each of said elements for reading out electrical information stored in the respective elements; and X-directional readout switching control means and Y-directional readout switching control means cooperative with each other for controlling said readout switching arrangement so as to read out electrical information stored in the respective elements in a time-seriated manner;

the improvement comprising:

a reset switching arrangement coupled to each of said elements for resetting the respective elements, said reset switching arrangement being coupled to said X-directional readout switching control means; and Y-directional reset switching control means coupled to said reset switching arrangement and cooperative with said X-directional readout switching control means for controlling the reset switching arrangement in cooperation with the X-directional readout switching control means so as to reset the respective elements in a time-seriated manner.

6. The improvement according to claim 5, wherein said reset switching arrangement includes a plurality of MOS-analog switches for resetting each of said elements individually.

7. The improvement according to claims 5 or 6, wherein said Y-directional reset switching control means includes an MOS-shift register operable in response to supplied pulse signals for controlling said reset switching arrangement in cooperation with said X-directional readout switching control means so as to reset the respective elements.

8. The improvement according to claims 5 or 6, wherein said X-directional readout switching control means and said Y-directional readout switching control means includes pulse controlled means respectively controlled by first and second predetermined pulse signals respectively having first and second predetermined frequencies for reading out electrical information stored in the respective elements in a time-seriated manner at said first predetermined frequency; and said Y-directional reset switching control means includes pulse control means controlled by said second predetermined pulse signals for resetting, in cooperation with said X-directional readout switching control means, the respective elements in a time-seriated manner at said first predetermined frequency.

9. In a solid state areal MOS-image sensor comprising:

a two-dimensional array of a plurality of radiation sensitive elements each responsive to radiation and each integrating and storing electrical information relating to received radiation;

a readout switching arrangement coupled to each of said elements for reading out electrical information stored in the respective elements; and X-directional readout switching control means and Y-directional readout switching control means cooperative with each other for controlling said readout switching arrangement so as to read out the electrical information stored in the respective elements in a time-seriated manner;

the improvement comprising:

a reset switching arrangement coupled to each of said elements for resetting the respective elements; and X-directional reset switching control means and Y-directional reset switching control means cooperative with each other for controlling said reset switching arrangement so as to reset the respective elements in a time-seriated manner.

10. The improvement according to claim 9, wherein said reset switching arrangement includes a plurality of MOS-analog switches for resetting each of said elements individually.

11. The improvement according to claims 9 or 10, wherein said X-directional reset switching control means and said Y-directional reset switching control means are MOS-shift registers operable in response to supplied pulse signals for controlling by the cooperation thereof, said reset switching arrangement so as to reset the respective elements in a time-seriated manner.

12. The improvement according to claims 9 or 10, wherein said X-directional readout switching control means and said Y-directional readout switching control means are pulse controlled means which are respectively controlled by first and second predetermined pulse signals respectively having first and second predetermined frequencies for reading out electrical information stored in the respective elements in a time-seriated manner at said first predetermined frequency; and said X-directional reset switching control means and said Y-directional reset switching control means are pulse control means which are respectively controlled by third and fourth predetermined pulse signals respectively having said first and second predetermined frequencies for resetting the respective elements in a time-seriated manner at said first predetermined frequency.

13. In a solid state image sensing device comprising:

an array of a plurality of radiation sensing elements each sensitive to radiation and each integrating and storing electrical data relating to received radiation;

readout means coupled to each of said elements for reading out the electrical data stored in the respective elements; and readout control means coupled to said readout means for controlling the readout means so as to read out the electrical data stored in the respective elements in a time-seriated manner;

the improvement comprising:

clear means coupled to each of said elements for clearing the electrical data stored in the respective elements; and clear control means coupled to said clear means for controlling the clear means so as to clear the electrical data stored in the respective elements in a time-seriated manner.

14. In a solid-state image sensing device comprising:

an array of a plurality of radiation sensing elements each sensitive to radiation and each integrating and storing electrical data relating to received radiation;

readout means coupled to each of said elements for reading out the electrical data stored in the respective elements; and readout control means coupled to said readout means for controlling the readout means so as to read out the electrical data stored in the respective elements in a time-seriated manner;

the improvement comprising:

clear means coupled to each of said elements for clearing the electrical data stored in the respective elements, said clear means being coupled to said readout control means; and clear control means coupled to said clear means and cooperative with said readout control means for controlling in cooperation with the readout control means, the clear means so as to clear the electrical data stored in the respective elements in a time-seriated manner.

* * * * *